(12) United States Patent
Crocker

(10) Patent No.: US 7,769,046 B1
(45) Date of Patent: *Aug. 3, 2010

(54) TECHNIQUE FOR INTERFACING MAC AND PHYSICAL LAYERS OF ACCESS NETWORKS

(75) Inventor: Daniel W. Crocker, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 336 days.

This patent is subject to a terminal disclaimer.

(21) Appl. No.: 11/701,150

(22) Filed: Jan. 31, 2007

Related U.S. Application Data

(63) Continuation of application No. 10/128,005, filed on Apr. 22, 2002, now Pat. No. 7,197,052.

(60) Provisional application No. 60/297,591, filed on Jun. 11, 2001.

(51) Int. Cl.
*H04J 3/24* (2006.01)

(52) U.S. Cl. .................................. 370/474; 370/469

(58) Field of Classification Search ........................ None
See application file for complete search history.

(56) References Cited

U.S. PATENT DOCUMENTS

| | | | |
|---|---|---|---|
| 6,810,520 B2 | 10/2004 | Lu et al. | |
| 6,937,571 B1 | 8/2005 | Acharya et al. | |
| 6,961,314 B1* | 11/2005 | Quigley et al. | 370/252 |
| 7,190,701 B2* | 3/2007 | Yi et al. | 370/469 |
| 7,197,052 B1* | 3/2007 | Crocker | 370/474 |
| 7,274,679 B2* | 9/2007 | Amit et al. | 370/343 |
| 2002/0093955 A1 | 7/2002 | Grand et al. | |
| 2002/0188908 A1 | 12/2002 | Yonge et al. | |
| 2005/0152398 A1* | 7/2005 | Shin | 370/469 |
| 2007/0127432 A1* | 6/2007 | Hwang et al. | 370/348 |
| 2009/0193248 A1* | 7/2009 | Carr | 713/151 |

OTHER PUBLICATIONS

*Data-Over-Cable Service Interface Specifications*, Radio Frequency Interface Specification, SP-RFIv2.0-I01-011231, ®Copy Right 1999, 2000, 2001 Cable Television Laboratories, Inc.

* cited by examiner

*Primary Examiner*—Jayanti K Patel
*Assistant Examiner*—Anthony Sol
(74) *Attorney, Agent, or Firm*—Weaver Austin Villeneuve & Sampson

(57) ABSTRACT

According to specific embodiments of the present invention, a standardized interface is provided for enabling controlled communication between MAC and PHY devices of an access network. In one embodiment, a vendor independent interface is described which may be implemented between a DOCSIS MAC layer and a DOCSIS PHY layer of a DOCSIS enabled data network, in order to enable any DOCSIS MAC and DOCSIS PHY devices (which may be from different vendors) to communicate with each other. Using the standardized interface, component manufacturers are able to combine different MAC and PHY devices from different vendors, thereby facilitating price and value competition between vendors. The standardized interface technique of the present invention may be extensible in ways which allow multiple PHY devices to share the same interface. Further, the interface technique of the present invention may be applied to a variety of different shared-access networks which use at least one shared access communication channel to communicate between a plurality of nodes in the network and a Head End of the network.

22 Claims, 13 Drawing Sheets

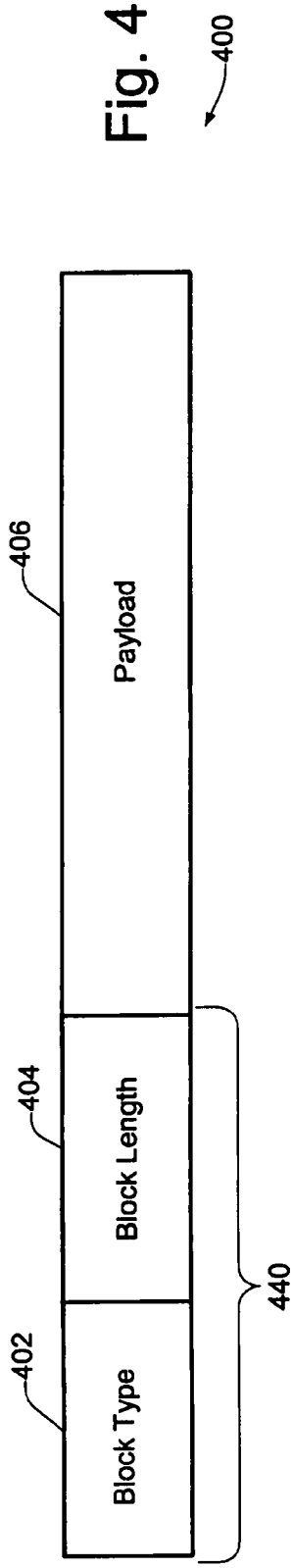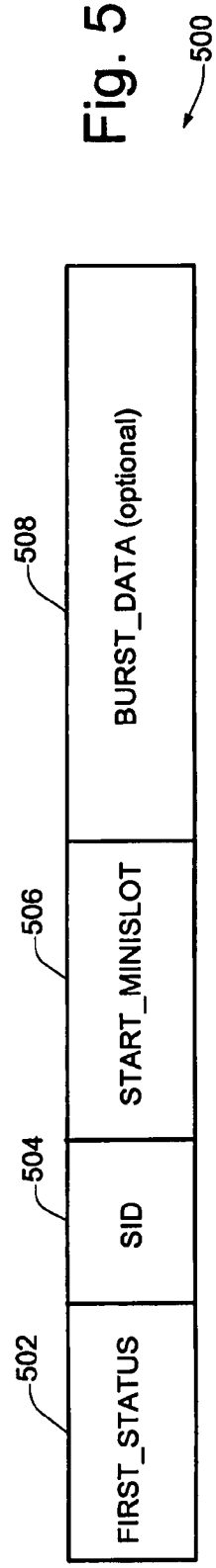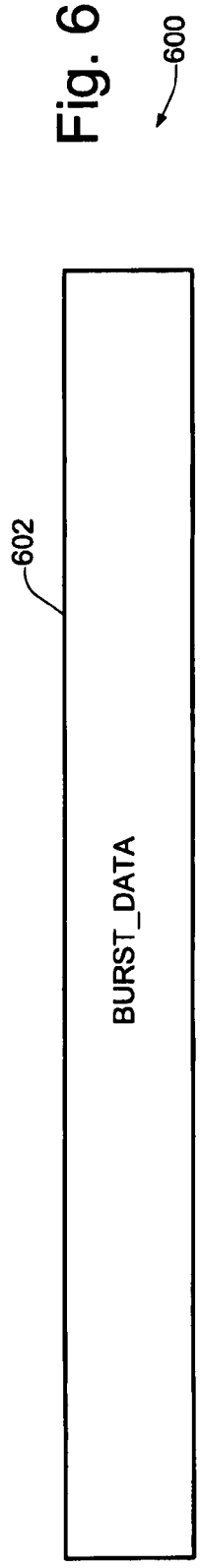

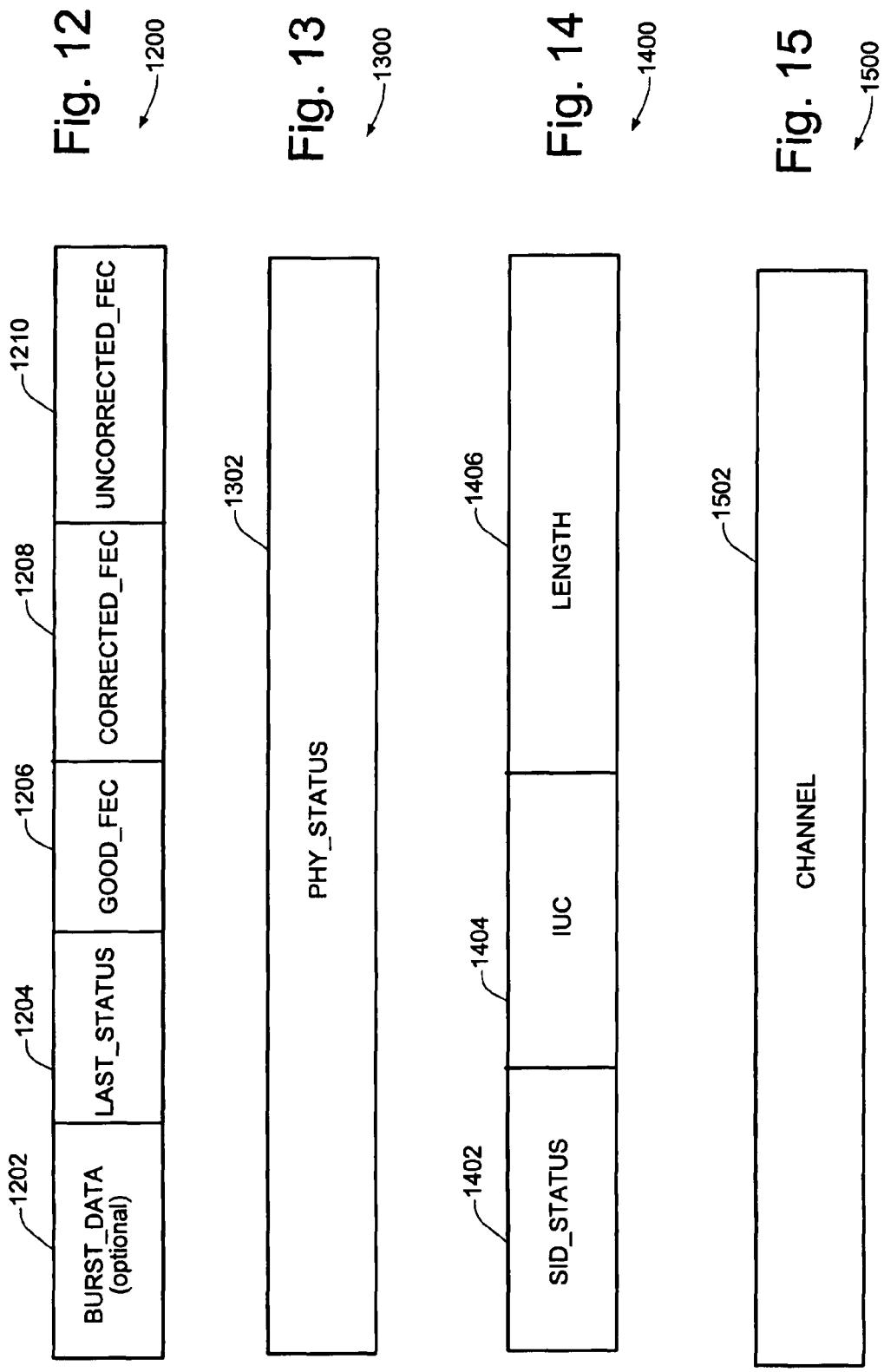

TECHNIQUE FOR INTERFACING MAC AND PHYSICAL LAYERS OF ACCESS NETWORKS

RELATED APPLICATION DATA

This application claims priority pursuant to the provisions of 35 U.S.C. 120, and is a continuation of prior U.S. patent application Ser. No. 10/128,005, entitled "TECHNIQUE FOR INTERFACING MAC AND PHYSICAL LAYERS OF ACCESS NETWORKS," by Daniel Crocker, filed on Apr. 22, 2002 now U.S. Pat. No. 7,197,052, from which benefit is claimed under 35 USC §119 to U.S. Provisional Application Ser. No. 60/297,591, naming Dan Crocker as inventor, and filed on Jun. 11, 2001. Each of these applications is incorporated herein by reference in its entirety for all purposes.

BACKGROUND OF THE INVENTION

The present invention relates generally to communications over a shared-access data network, and more specifically to a technique for interfacing MAC layers and physical (PHY) layers of access networks.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

FIG. 1 shows a block diagram of a conventional two-way hybrid fiber-coaxial (HFC) cable network 100. As shown in FIG. 1, the cable network 100 includes a Head End complex 102 typically configured to service about 40,000 homes. The Head End complex 102 may include a plurality of components and/or systems (not shown) such as, for example, a Head End, a super Head End, a hub, a primary hub, a second hub, etc.

Additionally, as shown in FIG. 1, the Head End complex 102 typically includes a Cable Modem Termination System (CMTS). Primary functions of the CMTS include (1) receiving data inputs from external sources 100 and converting the data for transmission over the cable plant; (2) providing appropriate Media Access Control (MAC) level packet headers for data received by the cable system, and (3) modulating and demodulating the data to and from the cable network. Typically, the Head End complex 102 is configured to provide a communication interface between nodes (e.g. cable modems) in the cable network and external networks such as, for example, the Internet. The cable modems typically reside at the subscriber premises 110A-D.

The Head End Complex 102 is typically connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End Complex 102 and the plurality of cable modems residing at the plurality of subscriber groups 110.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, Radio Frequency Interface Specification (document control number SP-RFIv2.0401-011231, Dec. 31, 2001). That document is incorporated herein by reference for all purposes.

Communication between the Head End Complex 102 and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the Head End Complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems 112a residing at subscriber premises 110a-d. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

FIG. 2 provides an example of a conventional DOCSIS enabled CMTS. In the embodiment shown in FIG. 2, the CMTS 204 provides functions on several layers including a physical layer 232, and a Media Access Control (MAC) layer 230. Generally, the physical layer is responsible for receiving and transmitting RF signals on the cable plant. Hardware portions of the physical layer include a downstream modulator and transmitter 206 and an upstream demodulator and receiver 214. The physical layer also includes software for driving the hardware components of the physical layer.

Upstream optical data signals (packets) arriving via an optical fiber node are converted to electrical signals by a receiver, and the upstream information packet is then demodulated by the demodulator/receiver 214 and passed to MAC layer block 230.

A primary purpose of MAC layer 230 is to encapsulate, with MAC headers, downstream packets and decapsulate, of MAC headers, upstream packets. The encapsulation and decapsulation proceed as dictated by the above-mentioned DOCSIS standard for transmission of data or other information. MAC layer block 230 includes a MAC controller 234 which is configured to provide the DOCSIS compliant functionality.

After MAC layer block 230 has processed the upstream information, it is then switched to an appropriate data network interface on data network interface 202. When a packet is received at the data network interface 202 from an external source, the packet is passed to MAC layer 230. The MAC controller 234 then transmits information via a one-way communication medium to downstream modulator and transmitter 206. Downstream modulator and transmitter 206 takes the data (or other information) in a packet structure and converts it to modulated downstream frames, which are then transmitted to downstream cable modems.

Conventionally, the interfaces between the DOCSIS MAC controller and the DOCSIS physical layer (PHY) hardware have been proprietary and closed. This is primarily due to the fact that the same vendor typically supplies both the MAC and PHY hardware as a complete chipset. Thus, when the chips are purchased as a set, interfacing the chips together does not present a problem. However, due to the proprietary nature of the chipset interfaces, a person having ordinary skill in the art would be unable to interface a MAC chip from one vendor with a PHY chip from another.

Recently, many component manufacturers such as, for example, Cisco Systems, Inc. are now designing their own MAC devices. However, as the number of different MAC chip and PHY chip vendors increases, the inability to combine MAC and PHY chipsets from different vendors presents an undesirable limitation on network implementation. For example, it is impractical to design a separate customized MAC device which supports each vendors' specific proprietary PHY device interface since, such an approach does not provide a scalable solution, and impedes the ability for new vendors to enter the market.

What is desirable, therefore, it to provide a standardized interface protocol between MAC and PHY hardware for enabling different MAC and PHY chipsets from different vendors to be combined in any desired combination. Additionally, it is also desirable to improve upon the interoperability of hardware and/or software components in access networks in order to accommodate new and emerging network applications and technologies.

SUMMARY OF THE INVENTION

According to various embodiments of the present invention, a method, device, and computer program product are provided for enabling communication between a physical layer device and an access control device in an access network. The access network includes a Head End and a plurality of nodes which communicate with the Head End via at least one upstream channel and at least one downstream channel. A first data parcel from a first node is received at the physical layer device. A plurality of data block messages are generated using information retrieved from the first data parcel. According to a specific embodiment, the plurality of data block messages may include a FIRST_DATA data block message type which includes information relating to an identify of the first node, and information relating to a time in which the first node transmitted the first data parcel. The plurality of data block messages may also include a LAST_DATA data block message type which includes information relating to error messages associated with either the first node or the physical layer device, and information relating to forward error correction (FEC) parameters. The plurality of data block messages are transmitted to the access control device.

In specific embodiments, the plurality of data block messages may also include: a PHY_STATUS data block message which includes information relating to channel characteristics associated with the at least one upstream channel; a NOBURST data block message which includes information relating to an absence of a valid burst of information being received at the physical layer device at a designated interface and a designated timeslot; and/or a CHANNEL data block message which includes information relating to a specific Channel ID associated with a particular upstream channel.

Alternate embodiments of the present invention are directed to a method, device, and computer program product for enabling communication between a physical layer device and an access control device in an access network. The access network includes a Head End and a plurality of nodes which communicate with the Head End via at least one upstream channel and at least one downstream channel. A first CHANNEL data block message is received from the physical layer device. The first CHANNEL data block message includes information relating to a specific Channel ID associated with a particular upstream channel. Subsequent information received after the receipt of the first CHANNEL data block message is then associated with the Channel ID specified in the first CHANNEL data block message.

BRIEF DESCRIPTION OF THE DRAWINGS

FIG. 4 shows an example of a format of a specific embodiment of data block message 400 which may be used for implementing various aspects of the interface technique of the present invention.

FIGS. 5-6 illustrate various types of information which may be included in different types of data block messages, in accordance with a specific embodiment of the present invention.

FIGS. 12-15 illustrate various types of information which may be included in different types of data block messages, in accordance with a specific embodiment of the present invention.

DETAILED DESCRIPTION OF THE PREFERRED EMBODIMENT

According to a specific embodiment of the present invention, a standardized interface is provided for enabling controlled communication between MAC and PHY devices. In one embodiment, a vendor independent interface is described which may be implemented between a DOCSIS MAC layer device and a DOCSIS PHY layer device of a DOCSIS enabled data network, in order to enable any DOCSIS MAC and/or any DOCSIS PHY device (which may be from different vendors) to communicate with one another. Using the standardized interface, system manufacturers are able to combine different MAC and PHY devices from different vendors, thereby facilitating price and value competition between vendors. According to a specific embodiment, the standardized interface of the present invention may be extensible in ways which allow multiple PHY devices to share the same interface.

According to specific embodiments, the interface technique of the present invention may be applied to a variety of different shared-access networks which use at least one shared access communication channel to communicate between a plurality of nodes in the network and a Head End of the network. An example of a shared-access network is a cable network.

A specific embodiment of the standardized interface technique of the present invention is described in U.S. Provisional application Ser. No. 09/862,220, naming Daniel W. Crocker as inventor, and filed on Jun. 11, 2001, the entirety of which is incorporated herein by reference for all purposes. It is noted that the interface technique as described in U.S. Provisional application Ser. No. 09/862,220 has been drafted in accordance with a standardized specification format. For this reason, the language describing the interface proposal may include absolute and unambiguous terms (such as, for example, the terms "must" and "shall"). It will be appreciated, however, that the interface described in U.S. Provisional application Ser. No. 09/862,220 merely defines a specific embodiment of the interface technique of the present invention. Alternate embodiments of the interface technique of the present invention may be derived by modifying various features of the specific embodiment defined in U.S. Provisional application Ser. No. 09/862,220. Such modifications will be apparent to one having ordinary skill in the art.

Figure 2:
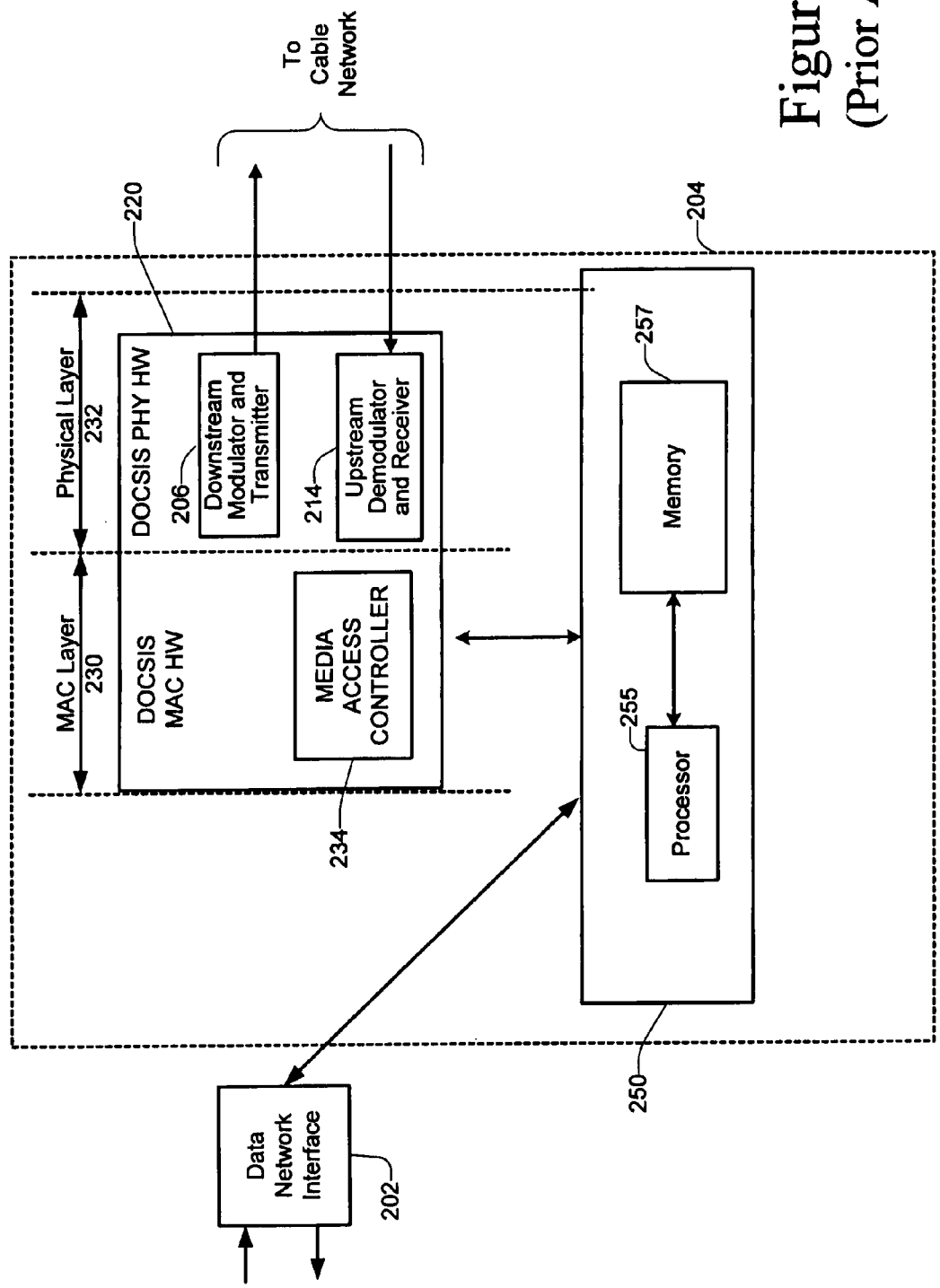
FIG. 2 provides an example of a conventional DOCSIS enabled CMTS.
Figure 3A:
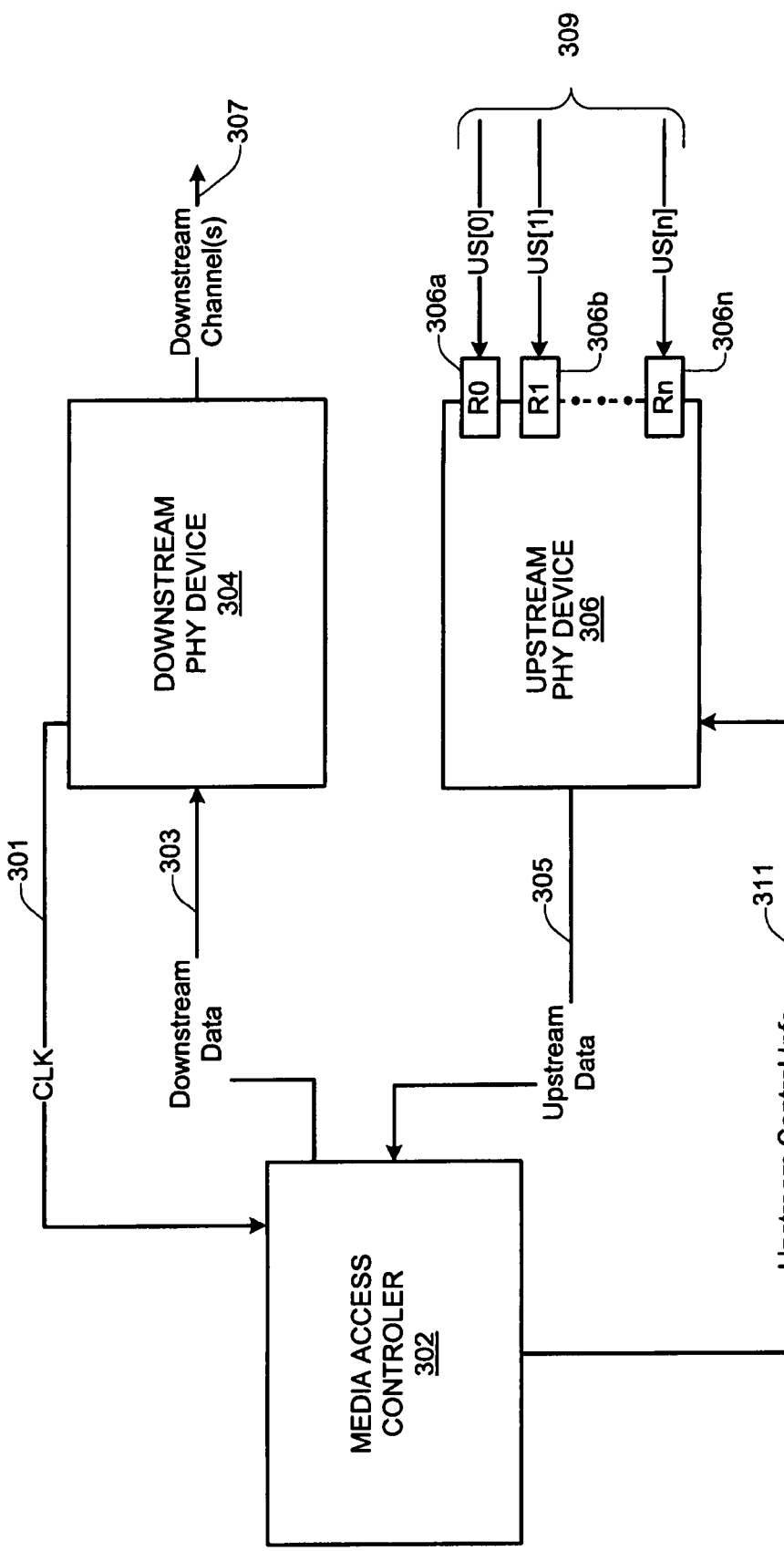
FIG. 3A shows a block diagram of a portion of a system 300 which may be used for implementing various aspects of the interface technique of the present invention.

FIG. 3A shows a block diagram of a portion of a system 300 which may be used for implementing various aspects of the interface technique of the present invention. According to specific embodiments, the various components illustrated in FIG. 3A may reside in a CMTS system such as, for example, a centralized CMTS residing at the head end of the cable network, or a distributed CMTS residing at one or more fiber nodes of the cable network. As illustrated in FIG. 3A, the system 300 may include at least one downstream PHY device 304 comprising downstream modulation and transmitting circuitry. The system 300 may also include at least one upstream PHY device 306 comprising upstream receiving and demodulation circuitry, and at least one media access controller (MAC device) 302. According to a specific embodiment, the functionality of the components 302, 304, 306 of FIG. 3A may be similar to the functionality of components 234, 206, and 214 described previously with respect to FIG. 2. In alternative embodiments components 302, 304, 306 of FIG. 3A may include additional functionality as described in the present application.

As illustrated in the embodiment of FIG. 3A, the downstream PHY device 304 provides a timing reference signal (CLK) 301 to media access controller 302. In conventional DOCSIS systems, such as that illustrated in FIG. 2, timing synchronization between the media access controller 234 and downstream modulator transmitter 206 was achieved using a bi-directional timing line connected between the media access controller 234 and the downstream modulator and transmitter 206. Depending upon the mode of operation, the clock of the media access controller 234 may be driven by the downstream modulator and transmitter 220, or the clock of the downstream modulator and transmitter 220 may be driven by the media access controller 234.

For example, during a first mode of operation referred to Annex B mode, the clock of the media access controller 234 may be driven by clock signals provided from the downstream modulator and transmitter 206. Alternatively, during a second mode of operation referred to as Annex A mode, the clock of the downstream modulator and transmitter 206 is driven by the media access controller 234. However, during this mode of operation, a first clock signal is provided by the downstream modulator and transmitter 206 to the media access controller 234, which is then used by the media access controller to generate a second clock signal which is then fed back to the downstream modulator and transmitter 206.

Moreover, in conventional systems such as that shown in FIG. 2, the first clock signal which is provided from the downstream modulator and transmitter 206 to the media access controller 234 is not the same clock signal which is used for transferring data from the media access controller to the downstream modulator and transmitter 206. Rather, the media access controller 234 modifies the clock signal received from downstream modulator and transmitter 206 uses the modified clock signal to drive its internal components, as well as the components of the downstream modulator and transmitter 206. Thus, in conventional DOCSIS systems, the clock signal which is provided from the downstream modulator and transmitter 206 to the media access controller is not directly used, in an unmodified form, by the media access controller for transferring data from the media access controller to the downstream modulator and transmitter.

One of the problems associated with timing synchronization between the MAC and downstream PHY devices in conventional DOCSIS systems is that the same physical wire is used to provide clock signals from the MAC device to the downstream PHY device (in Annex A mode) and from the downstream PHY device to the MAC device (in Annex B mode). This bi-directional implementation of clock signals over the same wire presents implementation difficulties and undesirable limitations.

In contrast to conventional implementations, a specific embodiment of the present invention, as illustrated, for example, in FIG. 3A, provides a single timing reference line 301 between the downstream PHY device 304 and MAC device 302. Additionally, timing reference signal line is configured to be a unidirectional line which allows the downstream PHY device 304 to drive the clock at the MAC device 302. Moreover, according to a specific implementation, the timing reference signals or clock signals which are provided from PHY device 304 are used directly by the MAC device 302 for transferring data (e.g. MPEG frames) from the MAC device 302 to the downstream PHY device 304. According to at least one implementation, the clocks of the downstream PHY device(s) and MAC device(s) are each driven from a single source at all times. By driving the different clock circuits from a single source, quality and reliability of the system may be improved.

One advantage of using the downstream PHY device 304 to drive the clocks of the downstream PHY device 304 and MAC device 302 is that, according to the DOCSIS protocol, the frequency of the clock may be required to change, depending upon the data rate of the downstream transmission. For example, in a DOCSIS enabled system where the data rate changes between QAM 64 and QAM 256, the frequency of the clock changes between 6 MHz and 12 MHz. Accordingly, by designing the downstream PHY device 304 to control the clock frequency of system 300, reliability of the system may be improved. Additionally, such a design helps to assure that the appropriate clock frequency is available for downstream transmission of data at a given data rate.

According to various embodiments, the downstream PHY device 304 may include one or more downstream transmitter and/or modulators. Additionally, the upstream PHY device 306 may include one or more upstream receivers (e.g. 306a, 306b, 306n, etc.) and/or demodulators. In the specific embodiment of FIG. 3A, the upstream PHY device 306 includes a plurality of upstream receivers 306, wherein different physical upstream channels 309 are each connected to a respective upstream receiver 306. The plurality of upstream receivers may be controlled by a single upstream PHY device such as, for example, an upstream PHY chip. Upstream control information is provided from the MAC device 302 to the upstream receivers 306 via one or more control interface lines 311. According to a specific implementation, a separate control interface line may be provided for each upstream receiver.

Figure 3B:
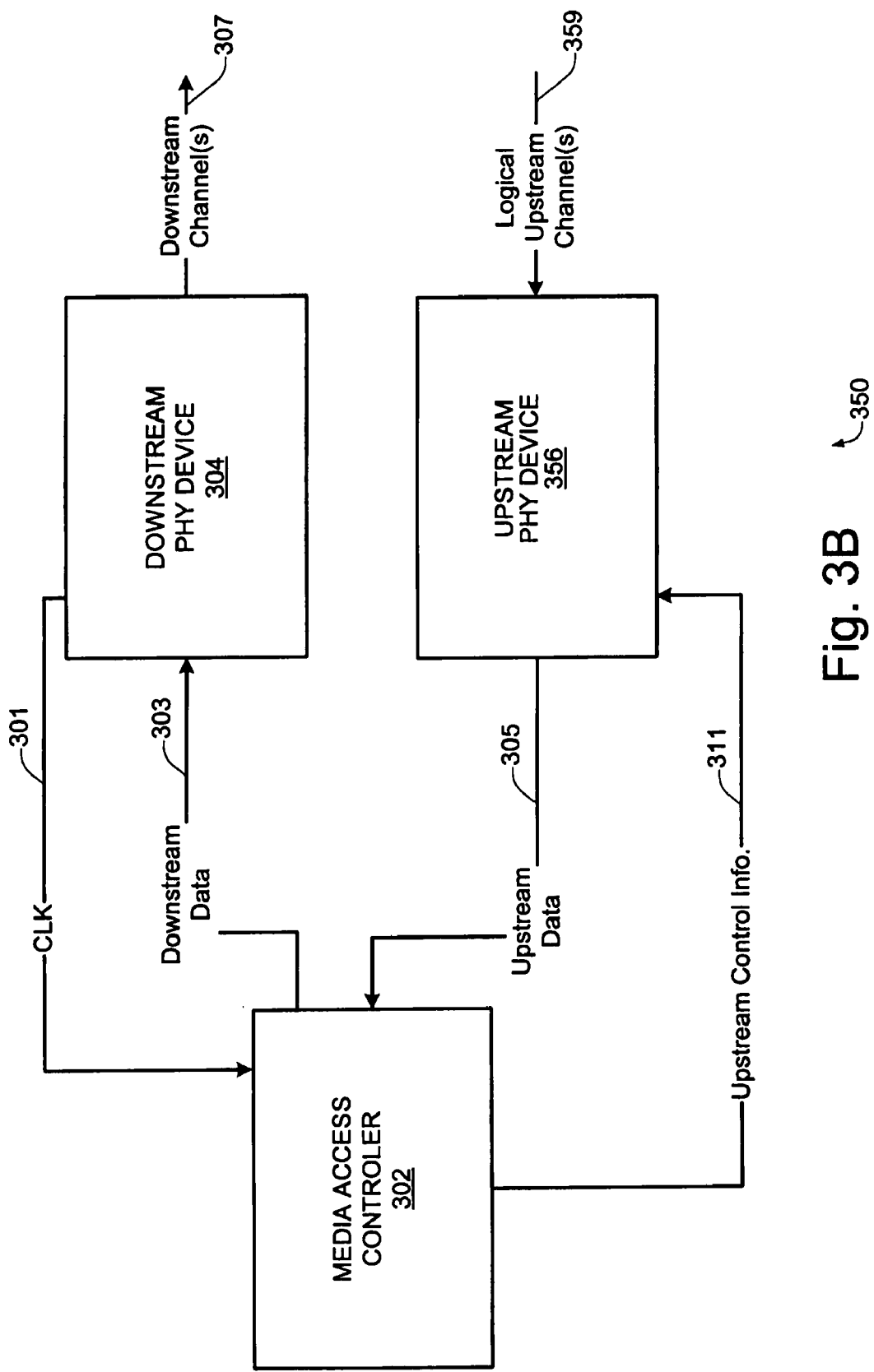
FIG. 3B shows an alternate embodiment of a system 350 which may be used for implementing various aspects of the interface technique of the present invention.

FIG. 3B shows an alternate embodiment of a system 350 which may be used for implementing various aspects of the interface technique of the present invention. In the embodiment of FIG. 3B, the upstream PHY device 356 is configured to receive a plurality of logical upstream channels 359. In a specific implementation, the upstream PHY device 356 may include a physical R/F interface which receives multiple logical upstream channels.

As described previously, one aspect of the present invention is directed to a standardized interface for enabling controlled communication between MAC and PHY devices such as, for example, those illustrated in FIGS. 3A and 3B of the drawings. According to a specific embodiment of the interface technique of the present invention, data may be transferred from the upstream PHY device to the MAC device using units referred to as data block messages.

According to specific embodiments of the present invention, data may be passed from the upstream PHY device to the MAC controller using a combination of variable sized units, herein referred to as data block messages. FIG. 4 shows an example of a format of a specific embodiment of data block message 400 which may be used for implementing various aspects of the interface technique of the present invention. The data block message 400 may be used to transmit data information and/or control information from the upstream PHY device to the MAC device.

As illustrated in FIG. 4, the data block message 400 may include a variety of different portions including, for example, a block type portion 402, a block length portion 404, and a payload portion 406. The block type portion 402 may be used for identifying the type of data block message transmitted from the upstream PHY device to the MAC device. According to a specific implementation, a plurality of different types of data block messages may be defined including, for example, a FIRST_DATA type, a MIDDLE_DATA type, a LAST_DATA type, a PHY_STATUS type, a NOBURST type, a CHANNEL type, etc. Detailed descriptions of the various types of data block messages are described below. According to a specific implementation, the data block messages may be transmitted from the PHY device 306 to the MAC device 302 via signal path 305.

As illustrated in FIG. 4, selected data block messages may also include a block length field 404, which may be used for specifying the length (e.g. in bytes) of the data or other information included in the payload portion 406 of the data block. The MAC device may use the information in the block length portion 404 to determine the end of the data field contained within the payload portion 406 of the data block message. According to a specific embodiment, information may be passed from the upstream PHY device to the MAC device using a combination of variable sized data block messages. In one implementation, some data block message types, such as, for example, a CHANNEL data block message type, may not include a block length portion 404.

As illustrated in FIG. 4, the data block format 400 may also include a payload portion 406. It is noted that the payload portion 406 may also be referred to as the "block data" portion of the data block message. According to a specific embodiment, the payload portion 406 may include either data or control information. A payload portion which includes data information may be referred to as a data payload. A payload portion which includes control information may be referred to as a control payload. According to a specific embodiment, the format and information contained within the payload portion 406 of a data block message may be characterized by the data block message type.

FIG. 5 shows an example of various types of information which may be included in the payload portion of a FIRST_DATA data block message, in accordance with a specific embodiment of the present invention. According to a specific embodiment, the FIRST_DATA data block message may be used, for example, to provide basic information to the MAC device about a particular burst (or packet) which has been received at an upstream PHY device via a particular upstream interface. Additionally, the FIRST_DATA data block message may also be used, if desired, to transport a first part of the received burst data of the MAC device.

As illustrated in FIG. 5, the FIRST_DATA payload portion 500 may include a plurality of different fields, including, a FIRST_STATUS field 502, an SID field 504, a START_MINISLOT field 506, a BURST_DATA field 508, etc. The FIRST_STATUS, SID, and START_MINISLOT fields may include format and/or control information relating to the burst data transfer. For example, the FIRST_STATUS field 502 may include information relating to the type of data transaction used, which may be derived, for example, from an associated interval control block (ICB). The FIRST_STATUS field may also include information which tells the MAC device whether to expect to receive a PHY_STATUS data block message at the end of the data burst transmission. The SID field 504 may be used to identify the identity (i.e. SID) of the cable modem which sent the burst received at the upstream PHY device. The START_MINISLOT field 506 may be used to indicate the time at which the identified cable modem sent the particular burst which was received at the upstream PHY device. If desired, the FIRST_DATA payload portion 500 may also include an optional BURST_DATA field 508 which may be used for transporting a first portion of burst data.

FIG. 6 shows an example of various types of information which may be included in the payload portion of a MIDDLE_DATA data block message, in accordance with a specific embodiment of the present invention. According to a specific implementation, the MIDDLE_DATA data block message is a specific type of data block message which may be optionally used, if desired, to transmit a middle portion of burst data from the upstream PHY device to the MAC device. As illustrated in the embodiment of FIG. 6, the MIDDLE_DATA payload portion 600 of a MIDDLE_DATA data block message includes a BURST_DATA field 602 used for transporting burst data from the upstream PHY device to the MAC device. According to at least one implementation, multiple MIDDLE_DATA data block messages may be used, if desired, to transport burst data from the upstream PHY device to the MAC device.

FIG. 12 shows an example of various types of information which may be included in the payload portion of a LAST_DATA data block message, in accordance with a specific embodiment of the present invention. According to a specific implementation, the LAST_DATA data block message may be sent to the MAC device when there is no further burst data (relating to a particular burst received at the upstream PHY device) to be sent to the upstream MAC device. As shown in the embodiment of FIG. 12, the LAST_DATA payload portion 1200 includes an optional BURST_DATA field 1202, a LAST_STATUS field 1204, a GOOD_FEC field 1206, a CORRECTED_FEC field 1208, and an UNCORRECTED_FEC field 1210. The BURST_DATA field 1202 may be used, if desired, to transport the final or last portion of the burst data to the MAC device. The LAST_STATUS field 1204 may be used to indicate status parameters associated with the received burst such as, for example, error indicators (e.g. internal PHY device error), energy transmission indicators (e.g., information which indicates whether the energy level of the transmission from the cable modem is within a specified range), etc. The GOOD_FEC field 1206 may be used to indicate a number of good Forward Error Correction (FEC) blocks in the burst (sent from the cable modem to the upstream PHY device). The CORRECTED_FEC field 1208 may be used to indicate a number of corrected FEC blocks in the burst. The UNCORRECTED_FEC field 1210 may be used to indicate a number of uncorrected FEC blocks in the burst.

FIG. 13 shows an example of a PHY_STATUS payload portion 1300 of a PHY_STATUS data block message, in accordance with a specific embodiment of the present invention. According to a specific implementation, the PHY_STATUS data block message may be implemented as an optional data block message type which may be optionally sent from the upstream PHY device to the MAC device, as described in greater detail below.

As shown in the embodiment of FIG. 13, the PHY_STATUS payload portion 1300 includes a PHY_STATUS field 1302 which may include PHY status information such as, for example, channel characteristics relating to timing error, power error, frequency error, equalizer coefficients, etc. According to a specific implementation, the contents of the PHY_STATUS data block message may be unique for specific PHY device vendors. According to one implementation, the PHY_STATUS information may be generated by the upstream PHY device, using information obtained, for example, during ranging and other status verification operations.

It is sometimes useful for the system to know when no usable burst was received at the PHY device during a transmit opportunity. According to a specific embodiment, a transmit opportunity may correspond to a timeslot in which one or more cable modems have the opportunity to transmit information on a given upstream channel to an upstream PHY device. The absence of a usable burst being received at the PHY device during a given transmit opportunity may happen, for example, when there is no transmitter (i.e., no energy) in the opportunity; there is more than one transmitter (a collision); when noise corrupted a transmission; etc. For contention regions (e.g. timeslots where cable modems compete for access to the upstream channel), knowledge of unused opportunities and/or collision occurrences helps software optimize its scheduling (e.g., duration and frequency) of such contention regions. For non-contention regions, these same events could be an indication of a problem with a cable modem, or an indication of illegal or malicious use of the upstream bandwidth. For these reasons, the PHY device may be configured to provide status to the MAC device when no burst is received.

FIG. 14 shows an example of a NOBURST payload portion 1400 of a NOBURST data block message, in accordance with a specific embodiment of the present invention. According to at least one embodiment, the NOBURST data block message may be used by the system to identify whether or not it was normal for the PHY device not to receive information on a particular upstream interface at a designated time slot. For example, according to a specific implementation, the MAC device may inform the upstream PHY device that it should expect to receive a valid burst of information on a particular interface at a particular time slot. Conventionally, if no valid burst was received at the upstream PHY device at the designated interface and timeslot, the MAC device would not be informed of this event. However, using the technique of the present invention, the upstream PHY device is able to transmit a NOBURST data block message to the MAC device, which effectively states that no valid burst of information was received at the upstream PHY device at the designated interface and timeslot. According a specific embodiments, the use of NOBURST data block messages may be optional.

As shown in the embodiment of FIG. 14, the NOBURST payload portion 1400 may include a SID_STATUS field 1402, an IUC field 1404, and a LENGTH field 1406. The SID_STATUS field 1404 may be used to indicate status information such as, for example, whether a collision did or did not occur, whether energy was detected at the designated interface and time slot, etc. According to a specific implementation, the SID_STATUS field 1404 may include a plurality of status bits, wherein a first status bit is used to indicate that a collision occurred during the transmit opportunity, and second status bit is used to indicate that there was no energy detected during the transmit opportunity. The SID_STATUS field 1402 may also include the identity (i.e., SID) of the cable modem from which the upstream burst of information was expected. The IUC field 1404 may be used to indicate the IUC value associated with the expected burst. According to a specific embodiment, the IUC value may be used to determine the type of transaction which was expected to be received at the designated interface/timeslot. The LENGTH field 1406 may be used to indicate the length of the timeslot interval for which no valid burst was received. In a specific embodiment where the interval corresponds to a channel or interface (e.g. logical or physical channel number). As described in greater detail below (such as, for example, with respect to FIG. 10 of the drawings), the information contained within the CHANNEL data block message may be used by the MAC device associating data which is subsequently received at the MAC device with a specific channel or interface. According to a specific implementation, the format of a CHANNEL data block message may include a block type portion 402 and a payload portion 406. In specific embodiments where the CHANNEL data block message is a fixed length, the block length portion 404 may be omitted.

According to specific embodiments, various types of multi-channel support may be provided by the interface technique of the present invention. For example, according to one implementation, the interface technique of the present invention may be configured to support both whole frame mode and partial frame mode. In whole frame mode, all data block messages associated with a single DOCSIS frame may be transferred contiguously over the DOCSIS MAC/PHY Interface (DMPI). This would mean that FIRST_DATA, MIDDLE_DATA, LAST_DATA, PHY_STATUS data block messages would all be transferred for a given frame of a given channel before any other data block messages were transferred for another channel. In this mode, a CHANNEL data block would likely precede the transfer of the FIRST_DATA Data Block. However, CHANNEL data block messages would not allowed before any of the other data block messages associated with this frame. This mode may be useful when a single PHY device is servicing multiple channels, and is collecting all data for an entire frame before transferring anything to the MAC device. Partial Frame Mode allows data block messages from different channels to be intermixed on DMPI, at the discretion of the PHY device. This mode may be used when multiple PHYs share the same DMPI interface, or when a single PHY transfers partial frames to the MAC device. In both of these modes, NOBURST data block messages may be preceded by one or more CHANNEL data block message.

According to a specific embodiment, the upstream PHY device may be configured or designed to minimize the number of data block messages which are needed to transfer a burst of information received from a specific cable modem. One advantage of such a configuration is that it helps to minimize the amount of overhead on the DMPI. In one implementation, each data block message which contains a data payload may include at least one FEC block of data. There is no specific requirement as to which data block message types contain which parts of the burst data. For example, the burst data may be contention interval, the LENGTH field 1406 may be represented by the length of the interval (as opposed to the length of each individual transmit opportunity in the interval).

According to a specific embodiment, transfer of a DOCSIS burst from the upstream PHY device to the MAC device may be accomplished by transferring a sequence of different types of data block messages according to the following quantities and order:

TABLE 1

| Order of Sequence | Quantity | Type |
|---|---|---|
| 1 | 1 | FIRST_DATA |
| 2 | 0-N | MIDDLE_DATA |
| 3 | 1 | LAST_DATA |
| 4 | 0-1 | PHY_STATUS |

According to a specific embodiment, at least one data block message may be transferred from the upstream PHY device to the MAC device for every transmit opportunity, as defined by DOCSIS. For example, according to one implementation, if a burst is received during a transmit opportunity, the appropriate series of data block messages are transferred to the MAC device (e.g. FIRST_DATA, MIDDLE_DATA, LAST_DATA, PHY_STATUS). If no burst is received, a NOBURST data block message may be transferred. Additionally, it is noted that since contention regions have multiple transmit opportunities, more than one set of data block messages may be transferred over the interface for each region (i.e., interval).

FIG. 15 shows an example of a CHANNEL payload portion 1500 of a CHANNEL data block message in accordance with a specific embodiment of the present invention. According to specific embodiments, the CHANNEL data block message may be used to define the specific channel for which subsequent data block messages (received at the MAC device) are to be associated. For example, in applications where data for multiple upstream channels is passed to the MAC device over a single DMPI interface, a CHANNEL data block message type may be used to specify to which channel each subsequent data block message belongs.

As shown in the embodiment of FIG. 15, the CHANNEL payload portion 1500 includes a CHANNEL field 1502 which includes the identity of a specific upstream distributed between the various data block message types at the discretion of the upstream PHY device, as long as the order of the data block message types follows a designated format such as that, described previously, for example, with respect to Table 1.

Figure 10:
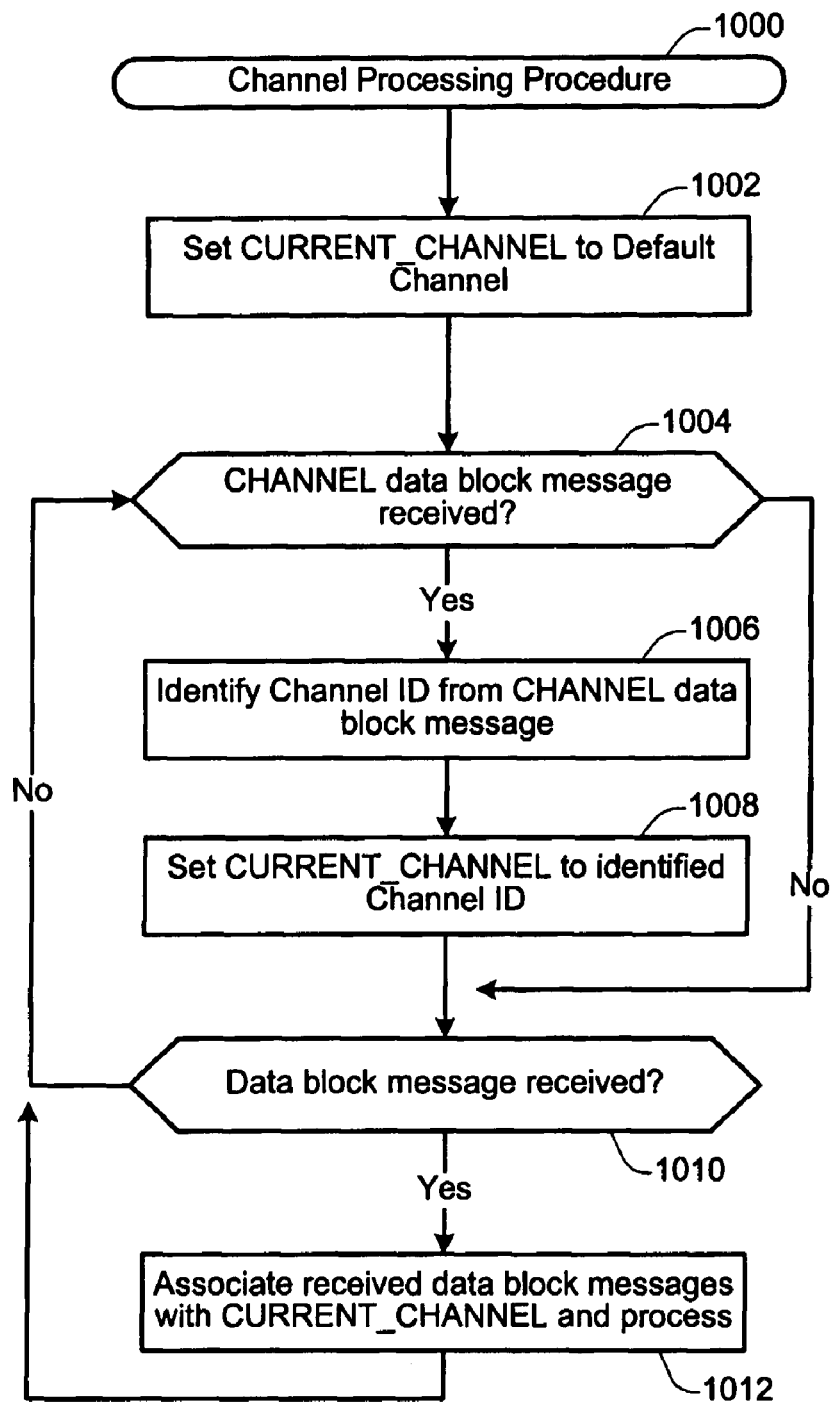
FIG. 10 shows a flow diagram of a Channel Processing Procedure 1000 in accordance with a specific embodiment of the present invention.

FIG. 10 shows a flow diagram of a Channel Processing Procedure 1000 in accordance with a specific embodiment of the present invention. In one implementation, the Channel Processing Procedure 1000 may be implemented at a MAC device to manage received data associated with specific logical or physical upstream channels. For example, a MAC device implemented in accordance with a specific embodiment of the present invention may be configured to associate data and/or status information received from the upstream PHY device with a specific Channel ID corresponding to the Channel ID information specified by a CURRENT_CHANNEL parameter. Each time a new CHANNEL data block message is received, the Channel ID information in the received CHANNEL data block message is used to update the Channel ID information in the CURRENT_CHANNEL parameter. Subsequent data block messages or status block messages which are received at the MAC device are associated with the Channel ID specified by the CURRENT_CHANNEL parameter until a new, subsequent CHANNEL data block message is received.

As illustrated in FIG. 10, a CURRENT_CHANNEL parameter is initialized at 1002 and set equal to a particular value corresponding to a designated default channel. According to one implementation, the default channel may correspond to Channel 0, which allows for backwards compatibility and interoperation for single and/or multiple channel devices, which may include, for example, DOCSIS PHY devices. At 1004 a determination is made as to whether a CHANNEL data block message has been received. An example of a CHANNEL data block message is described previously with respect to FIG. 15 of the drawings. If a CHANNEL data block message has not been received, then a determination is made (1010) as to whether a data block message (other than a CHANNEL data block message) has been received. Examples of data block message types are described previously with respect to FIGS. 5, 6 and 12-14 of the drawings. If a data block message has been received, the received data block message is associated (1012) with the channel corresponding to CURRENT_CHANNEL and processed accordingly. Thereafter, flow of the Channel Processing Procedure continues at operation 1004, wherein a determination is again made as to whether a CHANNEL data block message has been received.

Assuming that a CHANNEL data block message has been received, the Channel ID information contained within the received CHANNEL data block message is identified (1006). The CURRENT_CHANNEL parameter is then set (1008) to the Channel ID corresponding to the Channel ID identified in the received CHANNEL data block message. According to a specific implementation, the CURRENT_CHANNEL parameter may be stored in local memory of the MAC device such as, for example, a register. Data block messages which are subsequently received will be associated with the channel corresponding to the Channel ID identified in the most recently received CHANNEL data block message.

Figure 11:
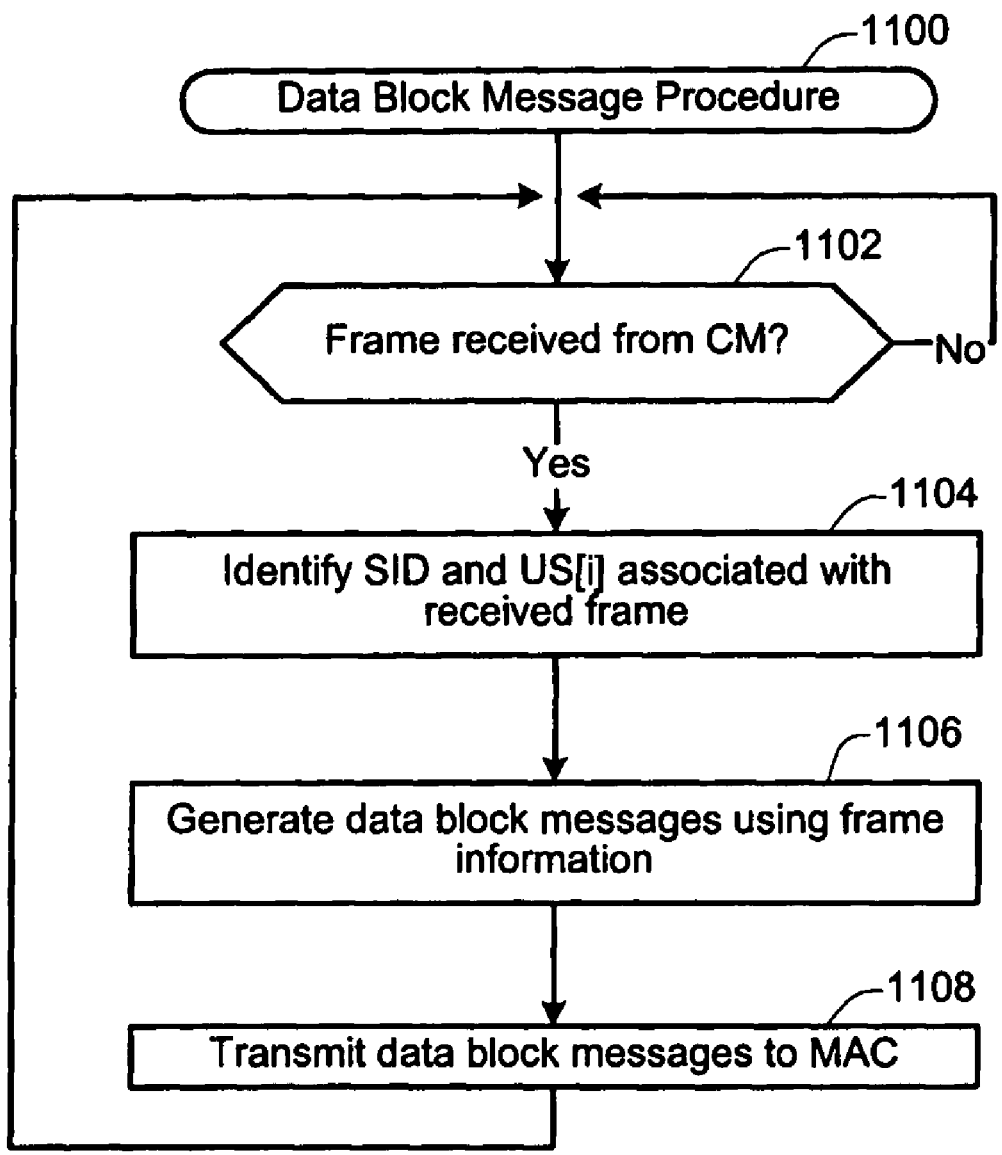
FIG. 11 shows a flow diagram of a Data Block Message Procedure 1100 in accordance with a specific embodiment of the present invention.

FIG. 11 shows a flow diagram of a Data Block Message Procedure 1100 in accordance with a specific embodiment of the present invention. According to one implementation, the Data Block Message Procedure may be implemented at an upstream PHY device, and used for generating and transmitting data block messages to a MAC device.

When a burst is received (1102) at the upstream PHY device from a cable modem, the service ID (SID) (associated with the cable modem) and upstream channel US[i] (which was used to carry the burst from the cable modem to the upstream PHY device) are identified (1104). According to different embodiments, the identified upstream channel may correspond to either a physical upstream channel or a logical upstream channel. The upstream PHY device may then generate (1106) appropriate data block messages using the SID information, upstream channel information, and/or other information from the received frame. After each data block message has been generated, it may be transmitted (1108) from the upstream PHY device to the MAC device using one of the embodiments of the interface technique of the present invention.

CMTS Configurations

Generally, the interface technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 7:
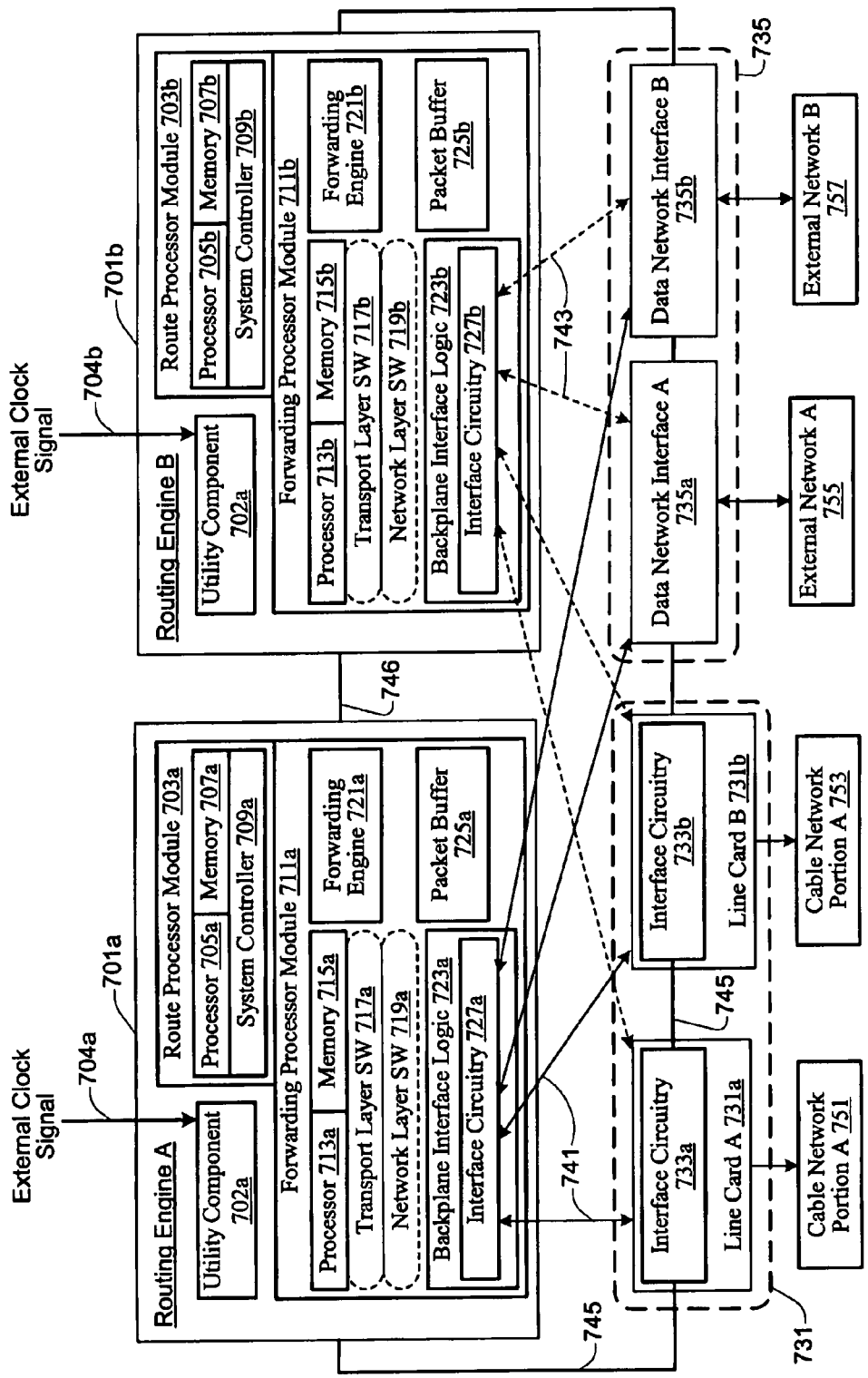
FIG. 7 shows a block diagram of a specific embodiment of a Cable Modem Termination System (CMTS) 700 which may be used to implement certain aspects of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b). In a specific implementation, Routing Engine A 701a may be configured as a primary or working routing engine, while Routing Engine B 701b may be configured as a backup or standby routing engine which provides redundancy functionality.

As shown in the embodiment of FIG. 7, each of the routing engines may include a variety of similar modules and/or components. In order to avoid confusion, the various components and/or modules relating to Routing Engine A 701a will now be described in greater detail with the understanding that such descriptions may also be applied to the corresponding components and modules of Routing Engine B 701b.

According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 707a may comprise synchronous dynamic random access memory (SDRAM) storage locations addressable by the processor 705a for storing software programs and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to a specific implementation, interface circuitry 727a may be configured to reside on a backplane logic circuit 723a of the routing engine. In one example, the backplane logic circuit 723a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 725a and a forwarding engine 721a of the FP Module 711a. The packet buffer 725a may include memory which is configured to store packets as the forwarding engine 721a performs its packet forwarding functions. For example, the packet buffer may be used to store low priority data packets while high priority, low latency voice packets are forwarded by the forwarding engine to a data network interface 735*a*. According to various embodiments, the FP Module 711 may comprise a processor 713*a* and memory 715*a* for handling transport layer 717 and network layer 719 functionality. In one implementation, the processor 713*a* may be configured to track accounting, port, and billing information for various users on a cable modem network 751. The processor 713*a* may also be configured to maintain desired service flow or session state information in memory 715*a* such as, for example, for voice calls initiated over the cable modem network. The FP Module 711*a* may also be configured to provide transaction compacting functionality, data parcel tunneling functionality, switching functionality, interface functionality, etc.

According to a specific implementation, Routing Engine A 701*a* may be connected to Routing Engine B 701*b* via at least one link 746, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701*a*, 701*b* via point-to-point links 741 and 743. One advantage of the point-to-point link configuration is that it provides additional reliability in that the failure of one or more line cards will not interfere with communications between other line cards and the routing engine(s). For example, if Line Card A 731*a* suddenly failed, each of the routing engines would still be able to communicate with the other line cards.

According to a specific embodiment, the plurality of line cards may include different types of line cards which have been specifically configured to perform specific functions. For example, line cards 731 may correspond to radio-frequency (RF) line cards which have been configured or designed for use in a cable network. Additionally, line cards 735 may correspond to network interface cards which have been configured or designed to interface with different types of external networks (e.g. WANs, LANs,) utilizing different types of communication protocols (e.g. Ethernet, Frame Relay, ATM, TCP/IP, etc). For example. the data network interface 735*a* functions as an interface component between external data sources and the cable system. The external data sources transmit data to the data network interface 735*a* via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 719*a*.

According to a specific implementation, the operations associated with obtaining an IP address for cable modems may be implemented by the network layer software. This may involve the CMTS communicating with a DHCP server (not shown) via a data network interface, for example.

As shown in FIG. 7, at least a portion of the line cards includes interface circuitry for providing an appropriate interface between the host line card, other line cards, and/or the routing engine(s). For example, interface circuitry 733*a* may include interconnect ports coupled to one or more of the point-to-point links 741, 743. According to a specific implementation, the interface circuitry functions as a translator that converts conventional formats of data received at the line cards to a suitable protocol format for transmission from the line card to the appropriate routing engine. In one implementation, the interface circuitry 733*a* may also include circuitry to perform cyclic redundancy code (CRC) generation and checking on packets, along with interconnect format checking.

According to a specific embodiment, the point-to-point links 741, 743 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (701*a*, 701*b*) and a portion of the cable network. The data network interface 735*a* may couple the routing engine 701*a* to an external data network 755 such as, for example, the Internet.

According to one embodiment, all or selected lines cards, routing engines and/or data network interfaces may be configured to use at least one common dedicated line or backplane (e.g. 745). According to other embodiments, the routing engines 701*a*, 701*b* may have an additional dedicated connection(s) for supporting redundancy. In a specific implementation, the backplane may be configured as an Ethernet medium that is shared by the CMTS. When the line cards are inserted into the backplane, they communicate with the routing engines over the lines 745 in accordance with a "capabilities" exchange that identifies the types of line cards and their various characteristics/parameters.

According to a specific implementation, during initialization of the CMTS, the routing engines 701*a* and 701*b* negotiate for working routing engine status over the backplane. Assertion of working status causes the line cards 731 to configure their respective interface circuitry to communicate with the designated working routing engine (e.g. Routing Engine A 701*a*). The Routing Engine A 701*a* then configures the CMTS and line cards, establishes routing relationships, and initiates traffic forwarding operations. The redundant routing engine 701*b* may complete a self-test and perform initialization of its various functions. The two routing engine assemblies may then exchange conventional negotiation messages (which may include, for example, health and status messages) via the backplane lines 745. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 701*b* detects that the primary routing engine has failed, the redundant routing engine may take over as the new working routing engine, and initiate a "cutover" operation to thereby cause the line card interface circuitry (e.g. 733a, 733b) to identify and communicate with the new working routing engine 701b. The new working routing engine 701b may then access and retrieve state information (such as, for example, telephone call state information, service flow state information, etc.) stored on selected line cards in order to maintain existing service flows.

Prior to a failure situation, the redundant routing engine 701b may be configured to monitor the status of the working routing engine 701a, and may further be configured or designed to receive updated configuration, transaction and/or state information, which may then be stored in an appropriate location in the redundant routing engine 701b.

The line cards may further comprise circuitry for "looping" packets back onto the redundant routing engine 701b over the point-to-point links. This allows the redundant routing engine 701b to send and receive test packets to evaluate its own operation in addition to the operation of the dedicated lines prior to the occurrence of a system failure.

The interface techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 707a, 715a, etc.) configured to store program instructions for the network operations and other functions of the present invention described herein. The program instructions may specify an operating system and one or more applications, for example. Such memory or memories may also be configured to store data structures and/or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
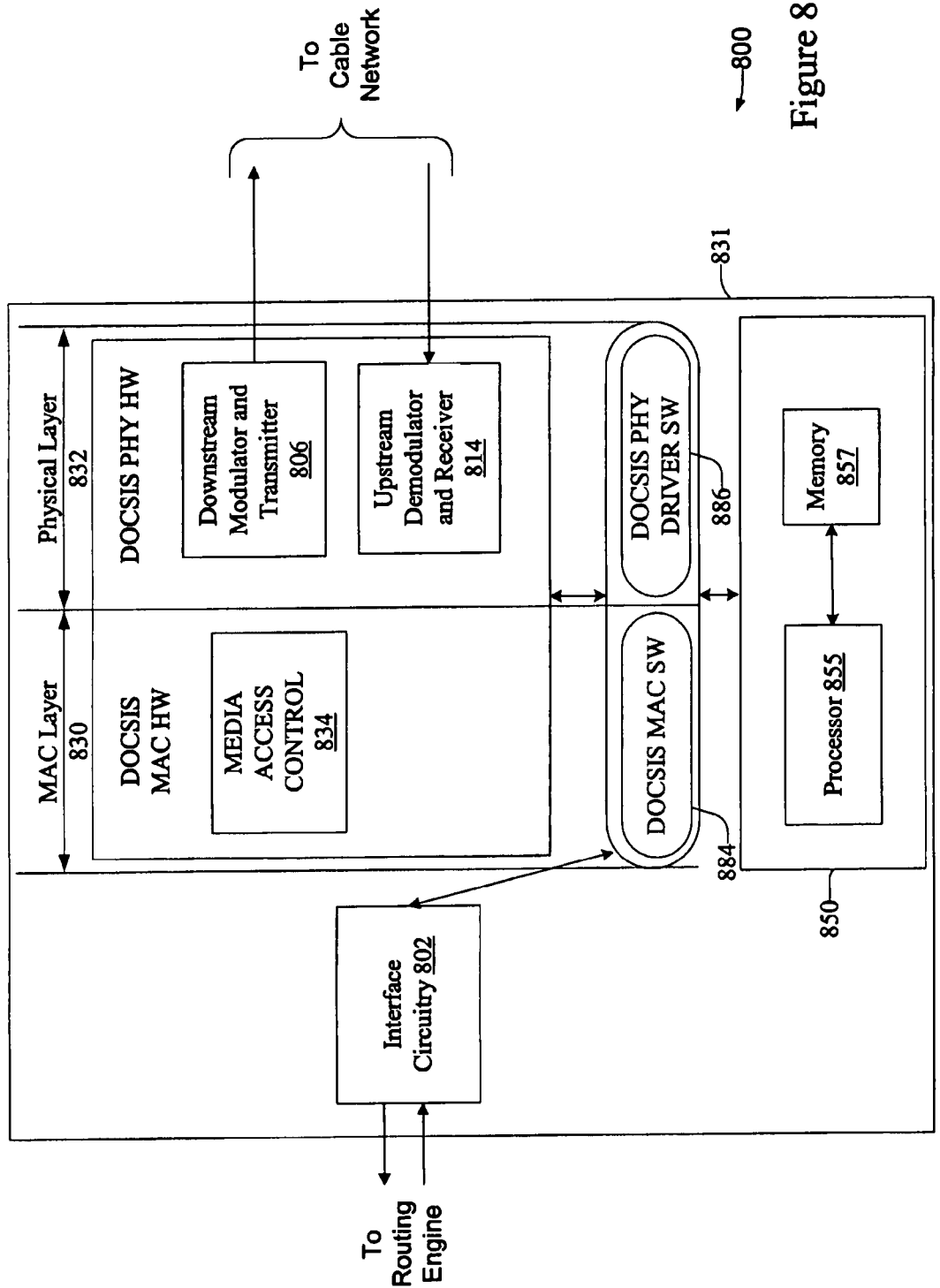
FIG. 8 shows a specific embodiment of a line card 800 which may be used for implementing certain aspects of the present invention.

FIG. 8 shows a specific embodiment of a line card 800 which may be used for implementing certain aspects of the present invention. According to a specific embodiment, the line card 800 may be configured or designed to implement selected aspects of the DOCSIS functionality which were conventionally implemented by the CMTS, such as, for example, DOCSIS MAC functionality.

In the specific embodiment as shown in FIG. 8, line card 800 provides functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer.

Upstream optical data signals (packets) arriving via an optical fiber node are converted to electrical signals, and then demodulated by the demodulator/receiver 814. The demodulated information is then passed to MAC layer block 830.

A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality, etc. The MAC layer hardware and software portions operate together to provide the above-described DOCSIS MAC functionality. In a preferred embodiment, MAC controller 834 is dedicated to performing some MAC layer functions, and is distinct from processor 855.

After MAC layer block 830 has processed the upstream information, it is then passed to interface circuitry 802. As described previously, interface circuitry 802 includes the appropriate hardware and/or software for converting data formats received at the line cards to a suitable protocol format for transmission from the line card to an appropriate routing engine.

When a packet is received from the routing engine at the interface circuitry 802, the packet is then passed to MAC layer 830. The MAC layer 830 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing the technique of the present invention may reside in such memory. In one embodiment, the software entities 882, 884, and 886 are implemented as part of a network operating system running on hardware 850. Preferably, at least a part of the interface functionality of this invention are implemented in software as part of the operating system. In FIG. 8, such software may be part of MAC layer software 884, or may be closely associated therewith. Of course, the interface logic of the present invention could reside in hardware, software, or some combination of the two.

According to a specific implementation, the procedures typically employed by the CMTS during registration and pre-registration may be performed at the MAC layer of the line card 800. In such an embodiment, most of the registration operations may be performed by the hardware and software provided for MAC layer logic 830.

Figure 16:
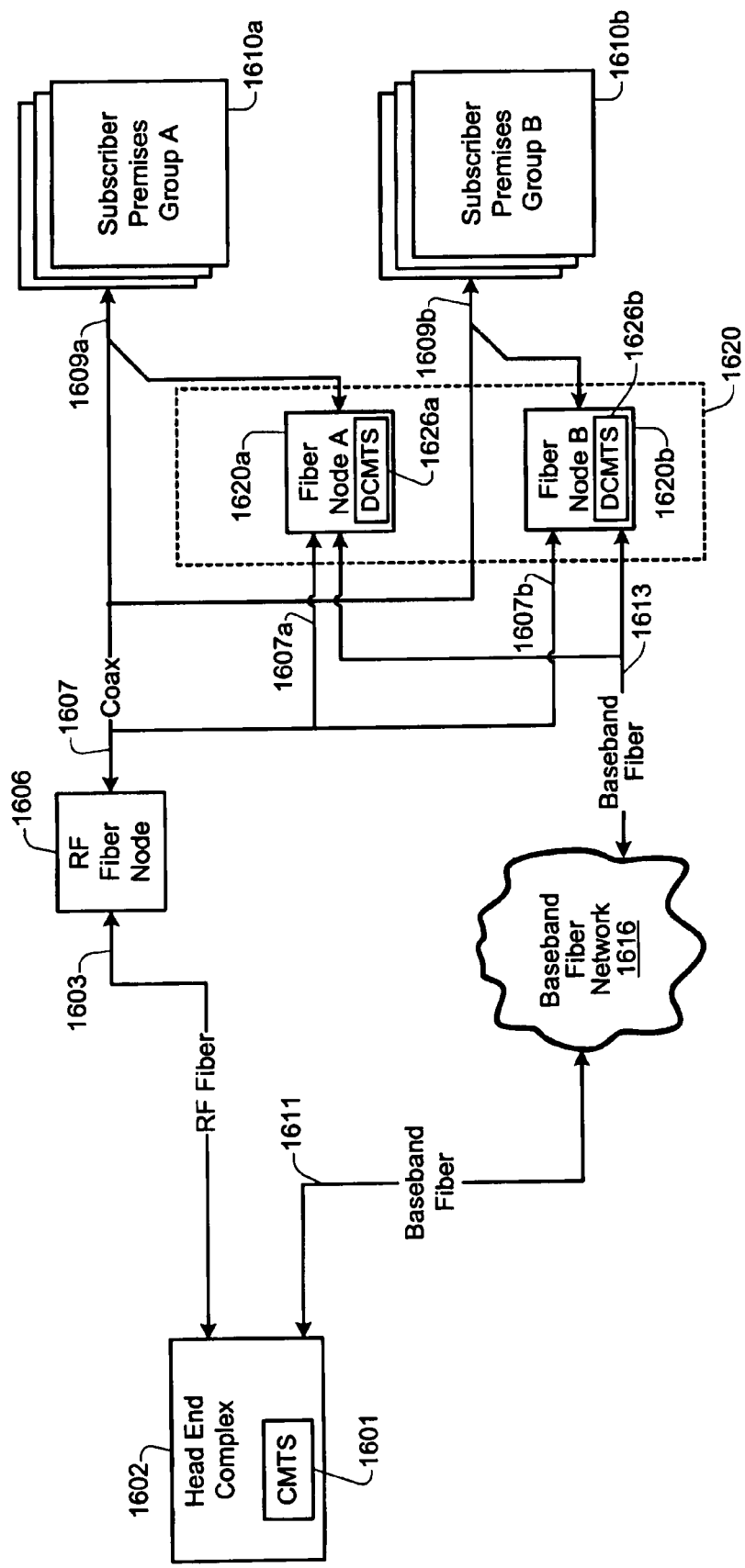
FIGS. 16 and 17 illustrate specific embodiments of cable networks which may be used for implementing the interface technique of the present invention.
Figure 17:
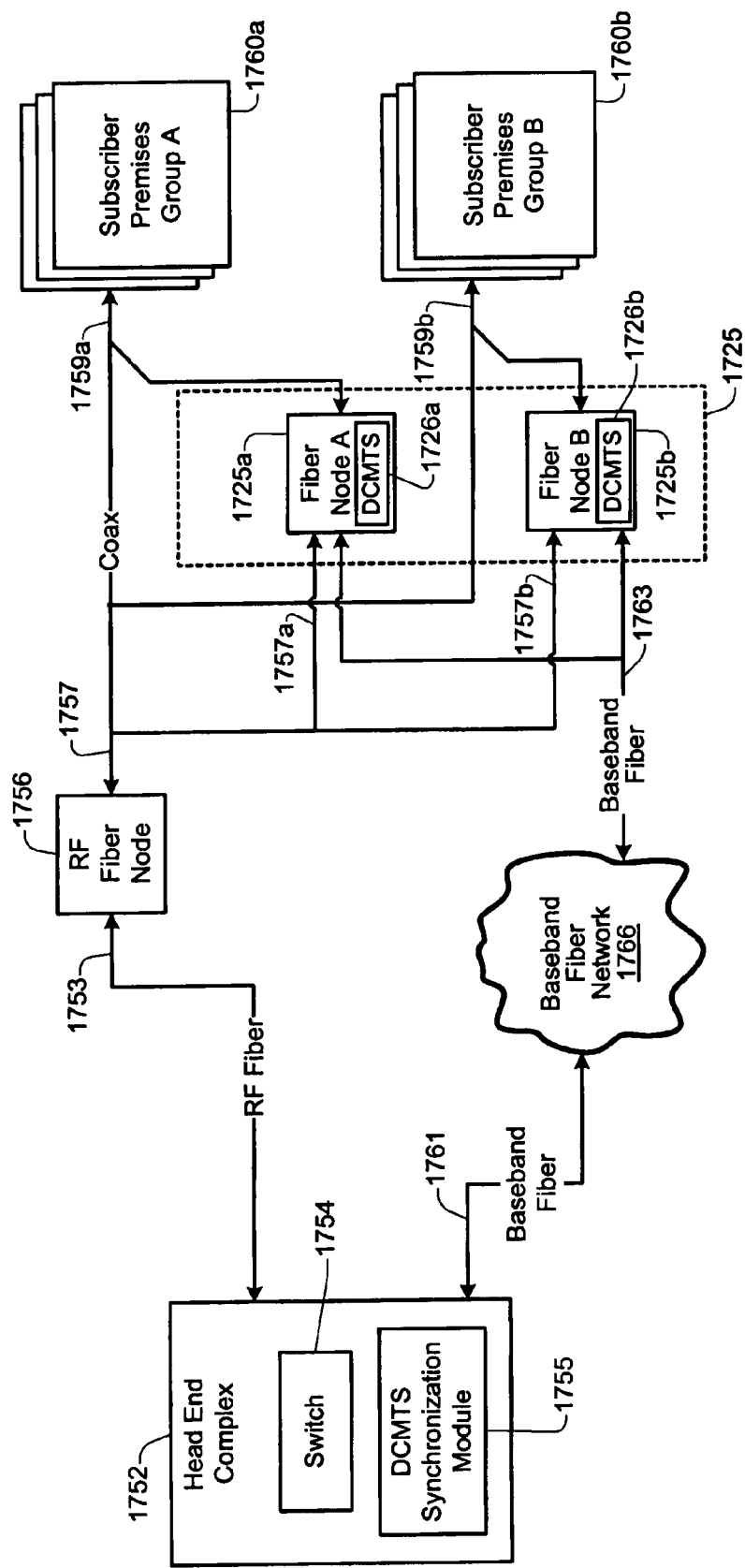

It will be appreciated that, according to a specific embodiments, at least a portion of functions described herein which are performed by the CMTS (e.g. FIG. 7), line cards (e.g. FIG. 8), and/or selected components thereof, may be implemented in a centralized CMTS system (e.g. residing at the Head End Complex of the cable network, as shown, for example, in FIG. 16), and/or may be implemented at one or more distributed CMTS (DCMTS) systems (e.g. residing at one or more fiber nodes, as shown, for example, in FIG. 17).

Further, it will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Other Embodiments

FIGS. 16 and 17 illustrate specific embodiments of cable networks which may be used for implementing the interface technique of the present invention. In the embodiment of FIG. 16, the Head End complex 1602 includes a centralized CMTS device 1601 which may be configured to implement DOCSIS functionality. A specific embodiment of the CMTS 1601 is described in greater detail below with respect to FIGS. 7 and 8 of the drawings.

Figure 1:
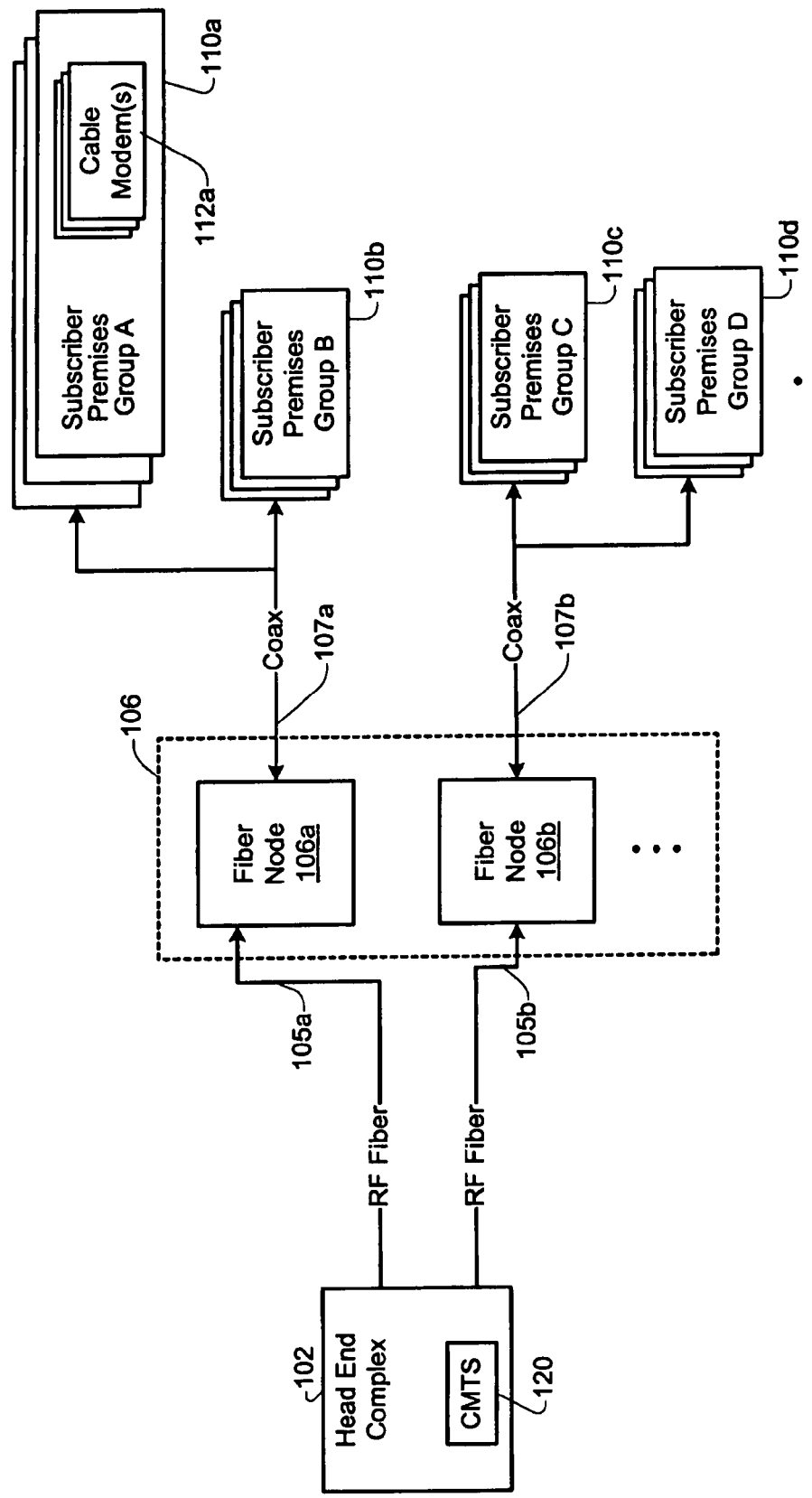
FIG. 1 shows a block diagram illustrating various components of the MAC and PHY layers which may be used for implementing certain aspects of the present invention.

As show in FIG. 16, the cable network 1600 includes two different types of fiber nodes, namely RF fiber nodes (e.g. 1606), and fiber nodes (e.g. 1620a, 1620b). According to a specific embodiment, the RF fiber node 1606 may be configured as a conventional fiber node such as fiber nodes 106 of FIG. 1. According to a specific implementation, the RF fiber node 1606 may be configured to handle all legacy RF downstream and upstream communications (such as, for example, set-top box signals, telemetry signals, etc., and communications which occur on centralized DOCSIS channels), and may be configured to perform additional functions associated with conventional fiber nodes.

As shown in the embodiment of FIG. 16, a baseband fiber network 1616 may be deployed which is coupled to the conventional cable network. The baseband fiber network may include a plurality of fiber nodes 1620, which are also coupled to the conventional fiber network. Each fiber node may be inserted into the cable network 1600 using a combiner and/or splitter which may be used to add and/or separate DOCSIS signals into/from the RF lineup.

Communication between the Head End Complex 1602 and the plurality of fiber nodes 1620 may be accomplished via the baseband fiber network 1616. For example, according to a specific implementation, one or more IP tunnels may be formed between the Head End Complex 1602 and the plurality of fiber nodes 1620 in order to allow for transmission and reception of IP packets. In a specific implementation, the IP tunnel(s) may be formed between the CMTS 1601 and one or more DCMTS devices 1626a, 1626b (residing at one or more fiber nodes). The CMTS 1601 may be configured to handle layer 3 functionality, including packet-related decisions, network layer decisions, IP related decisions, etc. Additionally, according to a specific implementation, the CMTS may also be responsible for handing redundancy and/or failover functionality for selected DCMTS devices.

According to specific embodiments of the present invention, each fiber node may include a distributed CMTS device (herein referred to as a "DCMTS"), which is configured to receive and transmit baseband optical signals from/to the Head End Complex 1602 via baseband fiber network 1616. According to a specific implementation, the DCMTS may be configured to perform conversions between packet protocols implemented over the baseband fiber media (e.g. 1611, 1613) and DOCSIS protocols implemented on the coax media (e.g. 1609a, 1609b). According to a specific embodiment, the functionality of the DCMTS may include all or a selected portion of the functionality provided by a conventional CMTS device. For example, the DCMTS may perform, at a relatively local level, at least a portion of the scheduling or MAC functions typically performed by conventional CMTS devices residing at the Head End complex. Additionally, the DCMTS may be configured to handle layer 1 and layer 2 functionality such as the OSI layer management (e.g. physical layer, RF layer, hardware), MAC layer management, data link layer management, framing functionality, DOCSIS protocol functionality, timestamp functionality, etc.

According to a specific implementations of the present invention, the fiber nodes may be pushed deeper into the network (i.e. closer to the subscriber groups) than conventional RF fiber nodes, which, as illustrated in FIG. 16, may result in a plurality of fiber nodes 1620 servicing subscriber groups (e.g. 1610a, 1610b) which are serviced by a single RF fiber node 1606. For example, the RF fiber node 1606 may be configured to service 1600 households past (HHP) while each fiber node may be configured to service 100 households past, resulting in 2 fiber nodes (1620a, 1620b) servicing the 1600 households which are serviced by the RF fiber node 1606.

In addition to being configured to receive baseband optical signals, the fiber nodes 1620 may also be configured to receive electrical signals from the RF fiber nodes via coax lines (e.g. 1607A, 1607B). Such electrical signals may include, for example, clock or other timing reference signals and/or timestamp synchronization signals.

FIG. 17 shows an alternate embodiment of a cable network 1750 which may be used for implementing the interface technique of the present invention. In the cable network of FIG. 17, the centralized CMTS typically residing at the Head End complex 1752 has been removed, and its functionality incorporated into selected DCMTS devices (e.g. 1726a, 1726b) residing in the fiber nodes 1725. Thus, according to the embodiment of FIG. 17, selected DCMTS devices residing in the fiber nodes 1725 may be configured to implement the functions typically implemented by the centralized CMTS device, such as, for example, layer 3 functionality and/or at least a portion of the functionality performed by the various logic described with respect to FIGS. 7 and 8 of the drawings.

According to a specific embodiment, communication of IP packets between the Head End complex 1752 and the plurality of fiber nodes 1755 may be accomplished without the use of a tunneling protocol. In such an embodiment, communication between network devices may be accomplished using, for example, a standardized IP protocol. Additionally, as shown in the embodiment of FIG. 17, the Head End complex 1752 may include a switch 1754 (e.g. Ethernet switch), or other type of traffic handling device which may be configured to route or forward traffic between network devices in the cable network 1750, or between the devices in the cable network and devices in external networks. Further, as shown in the example of FIG. 17, the Head End complex may also include a DCMTS Synchronization Module 1755 which may be configured to provide synchronized clock reference signals and/or synchronized timestamp information to the plurality of fiber nodes 1725.

While the discussion to this point has focused on interface techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing interface capability in a network having at least one traffic handling device (e.g., another switch or router) that provides normal service to a host. In the wireless system (e.g., represented by FIG. 9) the plurality of nodes or hosts corresponds to the plurality of wireless nodes 950 which use at least one shared access channel to communicate with at least one access control system 922 located at the Head End of the wireless system.

Figure 9:
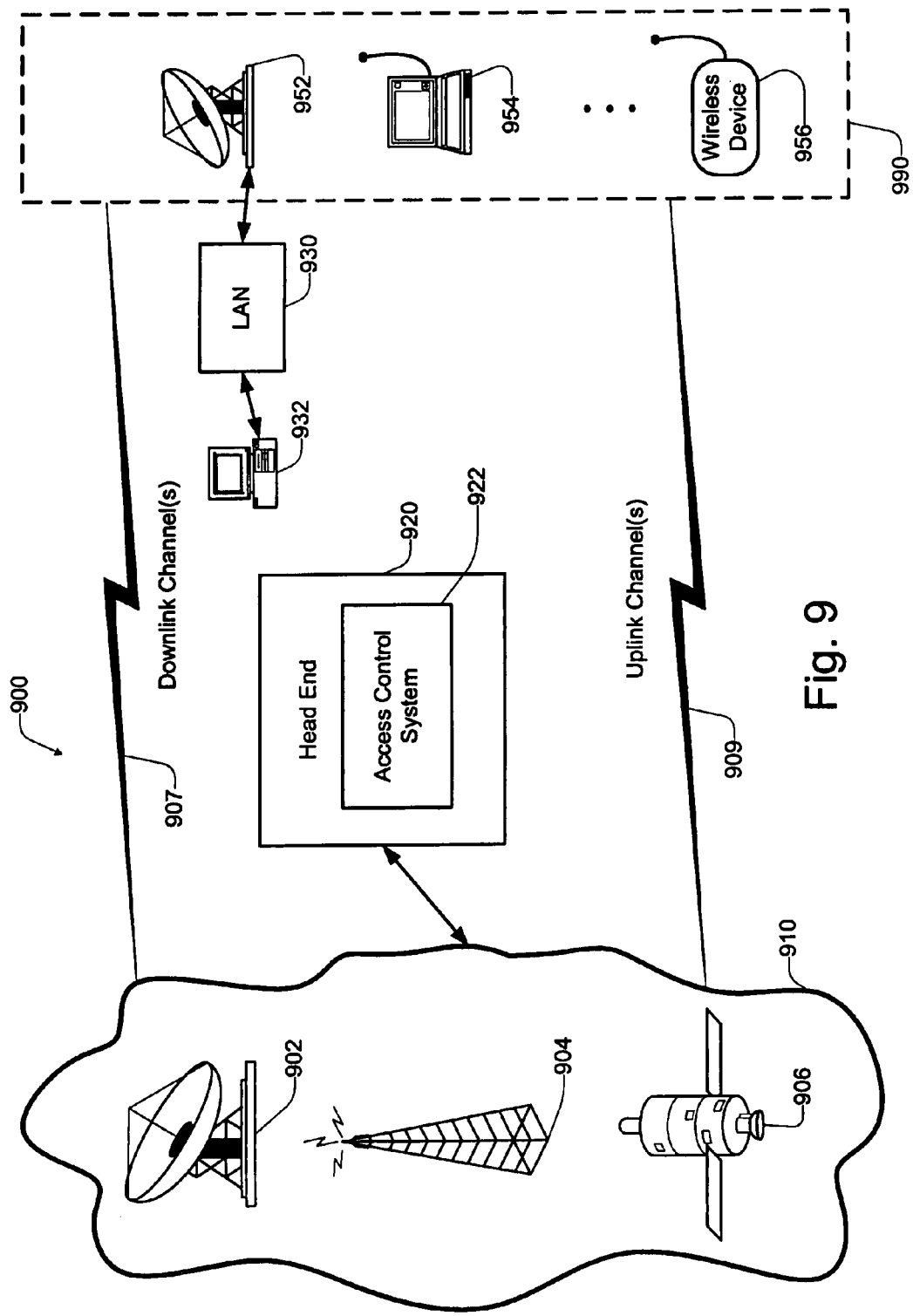
FIG. 9 shows an example of a wireless data communication system 900 which may be used for implementing the technique of the present invention.

FIG. 9 shows an example of a wireless data communication system 900 which may be used for implementing the technique of the present invention. As shown in FIG. 9, the wireless system includes a central termination system (or Head End) 920. The Head End includes an access controller or access control system (ACS) 922 which communicates with a plurality of wireless nodes 950, and coordinates access between each of the wireless nodes and the Head End 920. The access controller 922 may include memory and at least one processor. In a specific embodiment, the function of the access controller 922 is analogous to that of the CMTS described above with respect to cable modem networks. It may serve as a router or switch as well.

The Head End 920 communicates with a plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In a specific embodiment which is analogous to that of cable modem networks, the Head End 920 of the wireless computer system communicates with the plurality of nodes 950 via one or more downlink channels 907 and one or more uplink channels 909. Each downlink channel 907 is a broadcast-type channel utilized by the Head End to communicate with an associated group of wireless nodes within the wireless network. The uplink channel 909 is a shared-access channel, which is utilized by a group of wireless nodes (analogous to cable modems) to communicate with the Head End 920. The access controller 922 stores registration parameters for the various nodes that it services. It may also store the IP addresses for nodes that it services.

In a specific embodiment of the present invention, the registration process and information is similar to that of the cable network CMTSs described above. Moreover, the technique of the present invention for interface capability over a shared access data network may be implemented in wireless system 900.

The wireless devices or nodes 950 may include any one of a number of wireless transmitting/receiving devices. For example, a satellite dish 952 may be used to communicate with the Head End 920 via the uplink and downlink channels. The satellite dish may, in turn, be connected to a local area network (LAN) 930 which, may be further connected to one or more computer systems 932. Another wireless device may be a portable/wireless computer system 954, which is able to transmit and receive information to the Head End via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described interface techniques may easily be implemented in wireless system 900 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a Head End of the network.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for enabling communication between a first physical layer device and a first media access control (MAC) layer device in an access network, the method comprising:
   receiving, at the first MAC layer device, a plurality of data block messages originating from the first physical layer device, the plurality of data block messages including information generated by the first physical layer device using information obtained from a first data parcel received at the first physical layer device;
   wherein each of the plurality of data block messages includes a header portion and a payload portion;
   the header portion including a block type parameter usable for specifying a type of data block message;
   the header portion further including a block length parameter usable for specifying a length of the payload portion;
   wherein the plurality of data block messages includes a CHANNEL data block message;
   the CHANNEL data block message including information relating to a specific Channel ID associated with a particular upstream channel used to transport the first data parcel from a cable modem to the first physical layer device.

2. The method of claim 1:
wherein the plurality of data block messages are generated at the first physical layer device using information from the first data parcel; and
wherein the plurality of data block messages is received at the first MAC layer device from the first physical layer device.

3. The method of claim 1 wherein the block type parameter specifies a data block message type selected from a group consisting of: a FIRST_DATA message type, a MIDDLE_DATA message type, and a LAST_DATA message type.

4. The method of claim 1:
wherein the plurality of data block messages includes a LAST_DATA data block message relating to the first data parcel;
wherein the block type parameter of the LAST_DATA data block message specifies a LAST_DATA message type; and
wherein the payload portion of the LAST_DATA data block message includes information relating to forward error correction (FEC) parameters associated with the first data parcel.

5. The method of claim 1:
wherein the plurality of data block messages includes a FIRST_DATA data block message;
wherein the block type parameter of the FIRST_DATA data block message specifies a FIRST_DATA message type; and
wherein the payload portion of the FIRST_DATA data block message includes information relating to whether the plurality of data block messages includes a PHY_STATUS data block message type;
the PHY_STATUS data block message type being operable to provide information relating to channel characteristics associated with at least one upstream channel of the access network.

6. The method of claim 1 wherein the plurality of data block messages further comprises a NOBURST data block message type;
the NOBURST data block message type including information relating to an absence of a valid burst of information being received at the first physical layer device at a designated interface and a designated timeslot.

7. A method for enabling communication between a first physical layer device and a first media access control (MAC) layer device in an access network, the method comprising:
receiving, at the first MAC layer device, a plurality of data block messages originating from the first physical layer device, the plurality of data block messages including information generated by the first physical layer device using information obtained from a first data parcel received at the first physical layer device;
wherein each of the plurality of data block messages includes a header portion and a payload portion;
the header portion including a block type parameter usable for specifying a type of data block message;
the header portion further including a block length parameter usable for specifying a length of the payload portion;
wherein the plurality of data block messages includes a CHANNEL data block message type including information relating to a specific Channel ID associated with a particular upstream channel used to transport the first data parcel from a cable modem to the first physical layer device, the method comprising:
associating subsequent data block messages, which are received at the first MAC layer device subsequent to the reception of the CHANNEL data block message, with the Channel ID specified in the CHANNEL data block message.

8. The method of claim 7 wherein the plurality of data block messages is received from the first physical layer device.

9. The method of claim 7:
wherein the plurality of data block messages includes a FIRST_DATA data block message;
wherein the block type parameter of the FIRST_DATA data block message specifies a FIRST_DATA message type; and
wherein the payload portion of the FIRST_DATA data block message includes node ID information including information relating to an identify of the first node.

10. The method of claim 7:
wherein the plurality of data block messages includes a FIRST_DATA data block message;
wherein the block type parameter of the FIRST_DATA data block message specifies a FIRST_DATA message type; and
wherein the plurality of data block messages includes a LAST_DATA data block message;
wherein the block type parameter of the LAST_DATA data block message specifies a LAST_DATA message type.

11. The method of claim 7 wherein the access network is a DOCSIS enabled cable network.

12. A media access control (MAC) layer device of an access network comprising:
at least one processor;
at least one interface operable to facilitate communication with at least one physical layer device of the access network; and
memory;
the MAC layer device being operable to:
receive a plurality of data block messages originating from a first physical layer device, the plurality of data block messages including information generated by the first physical layer device using information obtained from a first data parcel received at the first physical layer device;
wherein each of the plurality of data block messages includes a header portion and a payload portion;
the header portion including a block type parameter usable for specifying a type of data block message;
the header portion further including a block length parameter usable for specifying a length of the payload portion;
wherein the plurality of data block messages includes a CHANNEL data block message;
the CHANNEL data block message including information relating to a specific Channel ID associated with a particular upstream channel used to transport the first data parcel from a cable modem to the first physical layer device;
the MAC layer device being further operable to:
determine whether at least one of the plurality of data block messages includes information relating to the specific Channel ID associated with the particular upstream channel used to transport the first data parcel from a cable modem to the first physical layer device.

13. The MAC layer device of claim 12 wherein the plurality of data block messages is received from the first physical layer device.

14. The MAC layer device of claim 12:
wherein the plurality of data block messages includes a FIRST_DATA data block message;
wherein the block type parameter of the FIRST_DATA data block message specifies a FIRST_DATA message type;
wherein the plurality of data block messages includes a LAST_DATA data block message;
wherein the block type parameter of the LAST_DATA data block message specifies a LAST_DATA message type;
the MAC layer device being further operable to:
identify the block type parameter of the FIRST_DATA data block message; and
identify the block type parameter of the LAST_DATA data block message.

15. The MAC layer device of claim 12 wherein the block type parameter specifies a data block message type selected from a group consisting of: a FIRST_DATA message type, a MIDDLE_DATA message type, and a LAST_DATA message type.

16. A media access control (MAC) layer device of an access network comprising:
at least one processor;
at least one interface operable to facilitate communication with at least one physical layer device of the access network; and
memory;
the MAC layer device being operable to:
receive a plurality of data block messages originating from a first physical layer device, the plurality of data block messages including information generated by the first physical layer device using information obtained from a first data parcel received at the first physical layer device;
wherein each of the plurality of data block messages includes a header portion and a payload portion;
the header portion including a block type parameter usable for specifying a type of data block message;
the header portion further including a block length parameter usable for specifying a length of the payload portion;
wherein the plurality of data block messages includes a CHANNEL data block message type including information relating to a specific Channel ID associated with a particular upstream channel used to transport the first data parcel from a cable modem to the first physical layer device, the MAC layer device being further operable to:
associate subsequent data block messages, which are received at the first MAC layer device subsequent to the reception of the CHANNEL data block message, with the Channel ID specified in the CHANNEL data block message.

17. The MAC layer device of claim 16:
wherein the plurality of data block messages includes a FIRST_DATA data block message;
wherein the block type parameter of the FIRST_DATA data block message specifies a FIRST_DATA message type;
wherein the payload portion of the FIRST_DATA data block message includes node ID information including information relating to an identity of the first node;
the MAC layer device being further operable to:
identify the block type parameter of the FIRST_DATA data block message; and
identify the payload portion of the FIRST_DATA data block message.

18. The MAC layer device of claim 16:
wherein the plurality of data block messages includes a LAST_DATA data block message relating to the first data parcel;
wherein the block type parameter of the LAST_DATA data block message specifies a LAST_DATA message type;
wherein the payload portion of the LAST_DATA data block message includes information relating to forward error correction (FEC) parameters associated with the first data parcel;
the MAC layer device being further operable to:
identify the block type parameter of the LAST_DATA data block message; and
identify and process the information relating to forward error correction (FEC) parameters.

19. The MAC layer device of claim 16:
wherein the plurality of data block messages includes a FIRST_DATA data block message;
wherein the block type parameter of the FIRST_DATA data block message specifies a FIRST_DATA message type; and
wherein the payload portion of the FIRST_DATA data block message includes information relating to whether the plurality of data block messages includes a PHY_STATUS data block message type;
the PHY_STATUS data block message type being operable to provide information relating to channel characteristics associated with at least one upstream channel of the access network;
the MAC layer device being further operable to:
identify the block type parameter of the FIRST_DATA data block message; and
determine whether the FIRST_DATA data block message includes information relating to whether the plurality of data block messages includes a PHY_STATUS data block message type.

20. The MAC layer device of claim 16 wherein the plurality of data block messages further comprises a NOBURST data block message type;
the NOBURST data block message type including information relating to an absence of a valid burst of information being received at the first physical layer device at a designated interface and a designated timeslot;
the MAC layer device being further operable to:
determine whether the plurality of data block messages comprises the NOBURST data block message type; and
determine whether at least one of the plurality of data block messages includes information relating to an absence of a valid burst of information being received at the first physical layer device at a designated interface and a designated timeslot.

21. The MAC layer device of claim 16 wherein the access network is configured as a DOCSIS enabled cable network.

22. A system for enabling communication between a physical layer device and a media access control (MAC) layer device in an access network, the system comprising:
means for receiving, at the first MAC layer device, a plurality of data block messages originating from the first physical layer device, the plurality of data block messages including information generated by the first physical layer device using information obtained from a first data parcel received at the first physical layer device;

wherein each of the plurality of data block messages includes a header portion and a payload portion;

the header portion including a block type parameter usable for specifying a type of data block message;

the header portion further including a block length parameter usable for specifying a length of the payload portion;

wherein the plurality of data block messages includes a CHANNEL data block message type including information relating to a specific Channel ID associated with a particular upstream channel used to transport the first data parcel from a cable modem to the first physical layer device; and means for associating subsequent data block messages, which are received at the first MAC layer device subsequent to the reception of the CHANNEL data block message, with the Channel ID specified in the CHANNEL data block message.

* * * * *